US 7,298,510 B2

(12) United States Patent
Natori

(10) Patent No.: US 7,298,510 B2
(45) Date of Patent: Nov. 20, 2007

(54) IMAGE ENLARGEMENT THROUGH POSTER PRINTING BY COMBINING PATTERN DATA WITH IMAGE DATA

(75) Inventor: Hideo Natori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 923 days.

(21) Appl. No.: 10/138,484

(22) Filed: May 6, 2002

(65) Prior Publication Data
US 2002/0175958 A1 Nov. 28, 2002

(30) Foreign Application Priority Data
May 10, 2001 (JP) ............... 2001-140697
May 10, 2001 (JP) ............... 2001-140698

(51) Int. Cl.
G06F 3/12 (2006.01)
G06F 13/00 (2006.01)
H04N 1/387 (2006.01)
H04N 1/393 (2006.01)

(52) U.S. Cl. ................ 358/1.15; 358/1.16; 358/1.18; 358/12; 358/450; 358/451; 715/517; 715/521

(58) Field of Classification Search .......... 358/1.2, 358/1.15, 1.12, 450, 1.13, 540, 3.28, 451, 358/1.18; 715/517, 527, 520–521; 710/15; 348/629; 382/294–299
See application file for complete search history.

(56) References Cited

U.S. PATENT DOCUMENTS 4,853,752 A  8/1989 Takahashi et al. ........... 355/77
5,311,259 A * 5/1994 Moriya et al. .............. 399/86
5,651,618 A * 7/1997 Tamiya ...................... 400/70
5,654,807 A * 8/1997 Miyaza ..................... 358/450
5,727,137 A * 3/1998 LeClair et al. ............. 358/1.17

(Continued)

FOREIGN PATENT DOCUMENTS

GB  2331388 A  5/1999

(Continued)

OTHER PUBLICATIONS

Japanese Office Action, issued Sep. 12, 2006 for corresponding Japanese application No. 2001-140697.

*Primary Examiner*—Scott A. Rogers
(74) *Attorney, Agent, or Firm*—Fitzpatrick, Cella, Harper & Scinto

(57) ABSTRACT

A printing system for enlarging/printing each document page by using a plurality of print sheets or for printing each page of a document upon superimposing a pattern on each page includes, in a printer driver which supplies print data to a printer, a user interface driver including a pattern setting unit which designates the number of parts divided in enlarging/printing each document page by using a plurality of printing sheets, and a feature of a pattern on a margin to paste up which is set on one side of at least one of the printing sheets and a pattern page creating unit which draws a page including only the pattern and inserting the pattern page prior to document print data, print processor functioning as a pattern page combining unit which creates a composite page by superimposing each page of the document print data and the pattern page, and a printer graphics driver functioning as an image creating unit which creates bitmap data of the composite page and supplies the data to a printing unit.

15 Claims, 18 Drawing Sheets

U.S. PATENT DOCUMENTS

| | | | |
|---|---|---|---|
| 5,951,174 A * | 9/1999 | Handa | 400/120.01 |
| 6,049,390 A * | 4/2000 | Notredame et al. | 358/1.15 |
| 6,160,632 A | 12/2000 | Campbell et al. | 358/1.17 |
| 6,187,405 B1 * | 2/2001 | Rudin | 428/43 |
| 6,222,949 B1 * | 4/2001 | Nakata | 382/298 |
| 6,256,109 B1 * | 7/2001 | Rosenbaum et al. | 358/1.2 |
| 6,268,927 B1 * | 7/2001 | Lo et al. | 358/1.15 |
| 6,507,411 B1 * | 1/2003 | Nishikawa et al. | 358/1.2 |
| 6,571,022 B2 * | 5/2003 | Okisu et al. | 382/294 |
| 6,591,076 B2 * | 7/2003 | Connors | 399/194 |
| 6,894,793 B1 * | 5/2005 | Roosen et al. | 358/1.15 |
| 7,064,858 B2 * | 6/2006 | Iwai et al. | 358/1.2 |
| 2002/0067502 A1 * | 6/2002 | Hansen | 358/1.15 |
| 2002/0075502 A1 | 6/2002 | Hayama | |
| 2002/0118374 A1 * | 8/2002 | Wanko | 358/1.2 |
| 2003/0202211 A1 * | 10/2003 | Yudasaka et al. | 358/1.18 |
| 2004/0085587 A1 * | 5/2004 | Broddin et al. | 358/3.06 |

FOREIGN PATENT DOCUMENTS

| | | |
|---|---|---|
| JP | 04-340653 A | 11/1992 |
| JP | 04343167 A * | 11/1992 |
| JP | 06-311335 A | 11/1994 |
| JP | 09-046510 A | 2/1997 |
| JP | 11-157137 A | 6/1999 |
| JP | 2000-025276 | 1/2000 |
| WO | 99/24933 | 5/1999 |

* cited by examiner

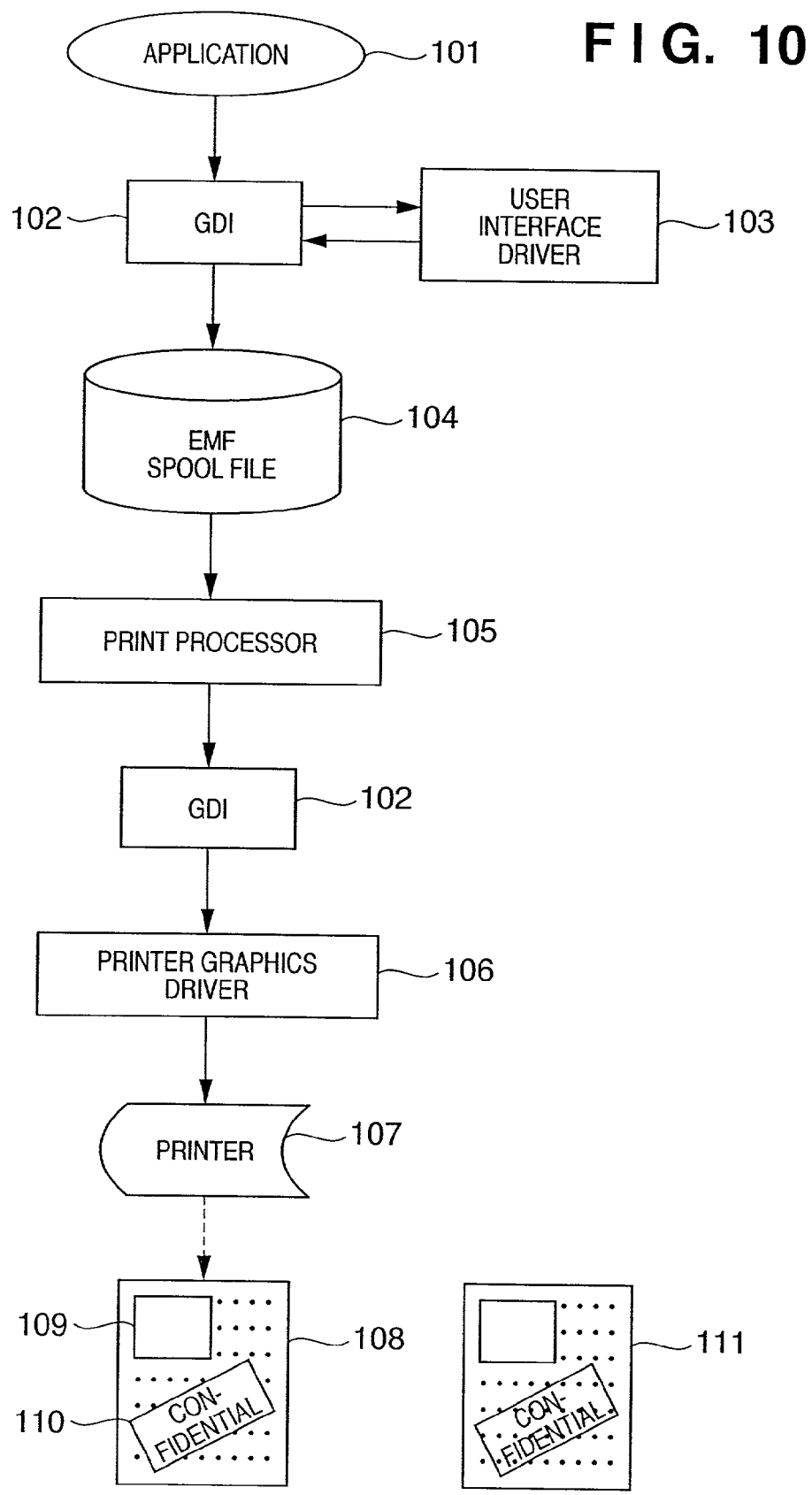

IMAGE ENLARGEMENT THROUGH POSTER PRINTING BY COMBINING PATTERN DATA WITH IMAGE DATA

FIELD OF THE INVENTION

The present invention relates to a print data creating method of creating print data including print data for information communication, which indicates information itself independently of a medium for information communication, and print data for function display, which is associated with, for example, an instruction to use or handle the medium, and a print system for the method.

BACKGROUND OF THE INVENTION

In some cases, print data, including print data used for information communication and print data for function display, is created to obtain a print result larger in size than the largest print sheet that a printer can handle. In general, a print result larger in size than the largest print sheet that the printer can handle can be obtained as follows. Print data is divided into parts, which are then separately printed a number of times, thus performing division printing. A plurality of printed paper sheets are properly laid out and pasted on each other. This operation makes it possible to obtain a print result larger in size than a print result obtained by printing within the original print sheet. The operation is called poster printing.

To realize this poster printing, e.g., to enlarge a document page handled by an application and divide it into parts to be printed on a plurality of paper sheets, a margin to paste up is set on at least one side of each paper sheet so as to facilitate pasting operation, thus performing printing. In some printers, the printable area is smaller than the size of a paper sheet. For this reason, a margin is left on a paper sheet after printing, and becomes an unnecessary area in pasting operation. In an extreme case, printed information is covered by a margin upon pasting operation. For this reason, printing is performed with a cut margin set in advance to allow the margin portion to be cut.

In addition, to facilitate cutting and pasting operations, dashed lines are printed on the print data sides of margins to paste up and cut margins, or character strings like "overlap width" and "cut here" are respectively printed on a margin to paste up and a cut margin. Alternatively, instead of character strings, graphic patterns such as icons representing "overlap width" and "cut here" are printed on margins. In this specification, such character strings and graphic patterns like icons will be generically called patterns hereinafter.

In the above conventional techniques, the following problems are left to be solved.

Conventionally, in printing a document with a pattern, the bitmap data of the pattern is created by a printer driver and is superimposed on the bitmap data of each page of the document. The resultant data is then sent to a printer. Therefore, a large storage area is required for the printer driver to combine bitmap data.

In addition, assume that in a network environment, an application creates print data on the client side, and the printer driver operates on the server side. In this case, if the server does not have the font of a character string as a pattern, an icon image, or the like designed by the user on the client side, a document with a pattern cannot be printed.

In distributing "confidential" documents as in a case wherein data including print data for information communication and print data for function display are printed, the character "confidential" may be sealed on each page of the document. Since it is expensive to manually affix a seal on each page of printed matter, an electronic mark "confidential" or the like is generally printed together with a document. A mark such as "confidential" is called a stamp.

In printing a document with a stamp, an application must have an input portion for receiving a character string or the like representing a stamp to combine the stamp designated by the user in creating the print data of each page of the document, and transmit the resultant data to the printer. In order to improve this operation, a technique of implementing a stamp function using a printer driver is available. According to this technique, an interrupt is generated in the execution of the printer driver in response to a command added in the printer driver to temporarily interrupt the operation. Control is then transferred to a sub-application to make it draw a stamp, thereby providing a stamp drawing command for the printer driver. The printer driver then superimposes the drawing data of the stamp on the print data of a document page created by the application.

However, the above-described conventional technique has the following drawbacks. In the above conventional technique, in printing a document with a stamp, the bitmap data of the stamp is created by the printer driver and superimposed on the bitmap data of each document page, and the resultant data is sent to the printer. Therefore, the printer driver requires a large storage area to combine bitmap data.

In addition, assume that in a network environment, an application creates print data on the client side, and the printer driver operates on the server side. In this case, if the server does not have the font of the stamp or the like designated by the user on the client side, the document with the stamp cannot be printed.

There have been demands for a technique of printing documents upon printing various marks, frames, and images (to be generically referred to as patterns hereinafter in this specification), as well as character strings, on paper sheets. In contrast to this, there have also been demands for a technique of printing patterns upon printing documents. Demands have therefore arisen for the development of a printing system which efficiently performs such processing.

SUMMARY OF THE INVENTION

It is an object of the present invention to provide a print data creating method and a printing system for the method, which can eliminate the conventional drawbacks, reduce the load imposed on a network by reducing the capacity of a storage area required to print print data including print data for information communication and print data for function display (overlap width or cut margin), and allows printing even without a necessary font and the like in a server.

It is another object of the present invention to provide a print data creating method and a printing system for the method, which can reduce the load imposed on a network by reducing the capacity of a storage area required to print print data including print data for information communication and print data for function display (stamp like "confidential"), and allows printing even without a necessary font and the like in a server.

In order to achieve the above objects, a print data creating method and a printing system for the method according to the present invention draw, in place of an application, a pattern page by using a print event notification from the system, and inserts the pattern page between document pages from the application, thereby storing the pages in a system-standard spool file. In de-spooling, superimposition processing is performed by a print processor, and a printer graphics driver converts the print data having undergone the superimposition processing into bitmap image and supplies it to the printer.

More specifically, according to the present invention, there is provided a print data creating method of creating print data including print data for information communication and print data for function display, characterized by comprising the steps of creating print data for function display and storing the print data independently of externally supplied print data for information communication, and combining print data selected from the print data for function display with each enlarged, divided print data for information communication and supplying the print data to a printer. In this case, the print data for function display includes a pattern on a margin to paste up which corresponds to a layout of an enlarged, divided print data for information communication. In addition, the print data for function display includes a pattern on a cut margin which corresponds to a layout of an enlarged, divided print data for information communication. Furthermore, the print data for function display is selected in accordance with a direction or size of a printing medium. Moreover, print data corresponding to each enlarged, divided print data for information communication is extracted from the print data for function display and combined with the print data for information communication.

In addition, there is provided a print data creating method characterized by comprising the adding step of creating information representing a pattern to be printed on a margin of each physical page and adding the information prior to document information when printing of one document page on a plurality of physical pages is set, and the creating step of creating data by combining a pattern to be printed on a margin of a physical page and an enlarged document on the basis of the information and document information added in the adding step.

In addition, according to the present invention, there is provided a printing system for creating print data including print data for information communication and print data for function display, characterized by comprising storage means for creating and storing print data for function display independently of externally supplied print data for information communication, and combining means for combining print data selected from the print data for function display with enlarged, divided print data for information communication, and supplying the print data to a printer. In this case, the print data for function display includes a pattern on a margin to paste up which corresponds to a layout of enlarged, divided print data for information communication. In addition, the print data for function display includes a pattern on a cut margin which corresponds to a layout of enlarged, divided print data for information communication. Furthermore, the system further comprises selection means for selecting the print data for function display in accordance with a direction or size of a printing medium. Moreover, the system further comprises extraction means for extracting print data corresponding to each enlarged, divided print data for information communication from the print data for function display and combining the extracted print data with the print data for information communication.

In addition, there is provided a printing system characterized by comprising addition means for creating information representing a pattern to be printed on a margin of each physical page and adding the information prior to document information when printing of one document page on a plurality of physical pages is set, and creating means for creating data by combining a pattern to be printed on a margin of a physical page and an enlarged document on the basis of the information and document information added by the addition means.

In addition, there is provided a printing system for enlarging/printing each document page by using a plurality of print sheets, characterized by comprising, in a printer driver which supplies print data to a printer, a pattern setting unit which designates the number of parts divided in enlarging/printing each document page by using a plurality of printing sheets, and a feature of a pattern on a margin to paste up which is set on one side of at least one of the printing sheets, a pattern page creating unit which draws a page including only the pattern and inserting the pattern page prior to document print data, a pattern page combining unit which creates a composite page by superimposing each page of the document print data and the pattern page, and an image creating unit which creates bitmap data of the composite page and supplies the data to a printing unit. In this case, the pattern page creating unit also draws and inserts a pattern page when a printing setting is changed between document pages during printing. In addition, the pattern setting section designates a pattern by performing property setting through a user interface of the printer driver. Furthermore, the pattern page creating unit creates a pattern page by performing enlargement/reduction processing and layout change of a pattern designated by the pattern setting unit in accordance with a paper size. Moreover, the pattern page creating unit creates a pattern page by performing enlargement/reduction processing and layout change of a pattern designated by the pattern setting unit in accordance with a size of a print area of a paper sheet.

In addition, there is provided a printing system characterized by comprising an application, a user interface driver which is activated and operated by a print event notified by the printing system which interprets a print command issued by the application, a print processor which can lay out print data of each page of print document data, issued by the application, in a page description language state on a page basis, and a printer graphics driver, wherein the application creates print document data formed from an arbitrary document, the printer user interface driver creates, in place of the application, a pattern page on which a pattern to be printed upon being superimposed on the print document data is drawn in accordance with a print event notified by the printing system on the basis of a driver property set in response to a request to print the print document data, the print processor superimposes enlarged print data of each page of the document and the pattern page, creates at least one page with respect to one page of the document, and supplies the composite page to the printer graphics driver, and the printer graphics driver creates bitmap data of the composite page and supplies the data to a printer. In this case, the user interface driver interprets a print event notified by the printing system, and creates, in place of the application, the pattern page at a printing start event and print setting change event. In addition, the processor detects a difference in print setting between pages of print data, and creates a composite page by acquiring and superimposing the optimal pattern page created by the user interface driver on each page of the print document data created by the application.

According to the present invention, there is provided a printer driver characterized by comprising an inserting module which creates, when printing of one document page on a plurality of physical pages is set, information representing a pattern to be printed on a margin of each physical page and inserts the information prior to document information, and a creating module which creates data by combining a pattern to be printed on a margin of a physical page and an enlarged document on the basis of the information and document information inserted by the inserting module. In this case, the pattern printed on the margin includes a cut margin or overlap width. In addition, the inserting module includes a user interface driver, and the creating module includes a print processor.

According to the present invention, there is provided a computer-readable storage medium which stores a control program for controlling a printing system for enlarging/printing each document page by using a plurality of print sheets, characterized in that the control program includes a program module which creates, in place of the application, a pattern page on which a pattern to be printed upon being superimposed on the print document data is drawn in accordance with a print event notified by the printing system on the basis of a driver property set in response to a request to print the print document data, a program module which superimposes enlarged print data of each page of the document and the pattern page, creates at least one page with respect to one page of the document, and supplies the composite page to the printer graphics driver, and a program module which creates bitmap data of the composite page and supplies the data to a printer.

With this arrangement, the following effects can be obtained:

(1) The print data of a pattern page and the print data of a document page are superimposed/combined, and the resultant data is converted into bitmap data. The bitmap data is then sent to the printer. This operation makes it possible to suppress the amount of storage area low, reduce the load on the computer, and increase the printing speed.

(2) Since the number of pattern pages inserted in a spool file does not depend on the number of print pages issued by an application, the size of data to be spooled can be small.

(3) In printing under a network environment, there is no need to use any special technique of transferring pattern pages from a client to a server. This makes it possible to shorten the data transfer time and reduce the load imposed on the network.

In addition, a print data creating method and a printing system for the method according to the present invention draw, in place of an application, a pattern page by using a print event notification from the system, and inserts the pattern page between document pages from the application, thereby storing the pages in a system-standard spool file. In de-spooling, superimposition processing is performed by a print processor, and a printer graphics driver converts the print data having undergone the superimposition processing into bitmap image and supplies it to the printer.

More specifically, according to the present invention, there is provided a print data creating method of creating print data including print data for information communication and print data for function display, characterized by comprising the steps of creating print data for function display and storing the print data independently of externally supplied print data for information communication, and superimposing the print data for function display on each print data for information communication and supplying the print data to a printer. In this case, the print data for function display includes a stamp pattern. In addition, the print data for function display is superimposed on either front and back surfaces or on one of front and back surfaces of the print data for information communication. Furthermore, the print data for function display is selected in accordance with a direction of a printing medium.

In addition, there is provided a print data creating method characterized by comprising the adding step of creating information representing a composite image and adding the information prior to document information when printing upon addition of the composite image onto a document page is set, and the creating step of creating data by combining a composite image and a document on the basis of the information added in the adding step and the document information.

According to the present invention, there is provided a printing system for creating print data including print data for information communication and print data for function display, characterized by comprising storage means for creating and storing print data for function display independently of externally supplied print data for information communication, and superimposing means for superimposing the print data for function display on each print data for information communication and supplying the print data to a printer. In this case, the print data for function display includes a stamp pattern. In addition, the superimposing means superimposes the print data for function display on either front and back surfaces or on one of front and back surfaces of the print data for information communication. Furthermore, the superimposing means includes selecting means for selecting the print data for function display in accordance with a direction or size of a printing medium.

There is provided a printing system characterized by comprising adding means for creating information representing a composite image and adding the information prior to document information when printing upon addition of the composite image onto a document page is set, and creating means for creating data by combining a composite image and a document on the basis of the information added by the adding means and the document information.

There is provided a printing system for printing each page of a document upon superimposing a pattern on each page, characterized by comprising, in a printer driver which supplies print data to a printer, a pattern setting unit which designates a feature of a pattern to be superimposed on each page of a document, a pattern page creating unit which draws a page including only the pattern and inserts the pattern page prior to print data of the document, a pattern page combining unit which creates a superimposition page by superimposing each page of the print data of the document and the pattern page, and an image creating unit which creates bitmap data of the superimposition page and supplies the data to a printing unit. In this case, the pattern page creating unit also draws and inserts a pattern page when a printing setting is changed between document pages during printing. In addition, the pattern setting section designates a pattern by performing property setting through a user interface of the printer driver. Furthermore, the pattern page creating unit creates a pattern page by performing enlargement/reduction processing and layout change of a pattern designated by the pattern setting unit in accordance with a paper size. Moreover, the pattern page creating unit creates a pattern page by performing enlargement/reduction processing and layout change of a pattern designated by the pattern setting unit in accordance with a size of a print area of a paper sheet.

There is provided a printing system characterized by comprising an application, a user interface driver which is activated and operated by a print event notified by the printing system which interprets a print command issued by the application, a print processor which can lay out print data of each page of print document data, issued by the application, in a page description language state on a page basis, and a printer graphics driver, wherein the application creates print document data formed from an arbitrary document, the printer user interface driver creates, in place of the application, a pattern page on which a pattern to be printed upon being superimposed on the print document data is drawn in accordance with a print event notified by the printing system on the basis of a driver property set in response to a request to print the print document data, the print processor creates a superimposition page by superimposing each page of the print data of the document and the pattern page, and supplies the data to the printer graphics driver, and the printer graphics driver creates bitmap data of the superimposition page and supplies the data to a printer. In this case, the user interface driver interprets a print event notified by the printing system, and creates, in place of the application, the pattern page at a printing start event and print setting change event. In addition, the processor detects a difference in print setting between pages of print data, and creates a page by acquiring and superimposing the optimal pattern page created by the user interface driver on each page of the print document data created by the application.

According to the present invention, there is provided a print driver characterized by comprising an inserting module which creates information representing a composite image and inserting the information prior to document information when printing upon addition of the composite image onto a document page is set, and a creating module which creates data by combining a composite image and a document on the basis of the information inserted by the inserting module and the document information. In this case, the inserting module includes a user interface driver, and the creating module includes a print processor.

According to the present invention, there is provided a computer-readable storage medium which stores a control program for controlling a printing system for printing each page of a document upon superimposing pattern on each page, characterized in that the control program includes a program module which creates, in place of the application, a pattern page on which a pattern to be printed upon being superimposed on the print document data is drawn in accordance with a print event notified by the printing system on the basis of a driver property set in response to a request to print the print document data, a program module which creates a superimposition page by superimposing each page of print data of the document and the pattern page, and a program module which creates bitmap data of the superimposition page, and supplies the data to a printer.

With this arrangement, the following effects can be obtained:

(1) The print data of a pattern page and the print data of a document page are superimposed/combined, and the resultant data is converted into bitmap data. The bitmap data is then sent to the printer. This operation makes it possible to suppress the amount of storage area, reduce the load on the computer and increase the printing speed.

(2) Since the number of pattern pages inserted in a spool file does not depend on the number of print pages issued by an application, the size of data to be spooled can be small.

(3) In printing under a network environment, there is no need to use any special technique of transferring pattern pages from a client to a server. This makes it possible to shorten the data transfer time and reduce the load imposed on the network.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a block diagram of a printing system according to a second embodiment of the present invention;

DETAILED DESCRIPTION OF THE PREFERRED EMBODIMENTS

The embodiments of the present invention will be described below by using specific examples. As preferred embodiments, two examples of poster printing and stamp printing are described below. However, the present invention is not limited within a scope of the examples, but can be adapted for any other systems for printing information combined with "pattern". These systems are included in a scope of the present invention.

Example of Poster Printing in First Embodiment

Example of Arrangement of Printing System of First Embodiment

Figure 1:
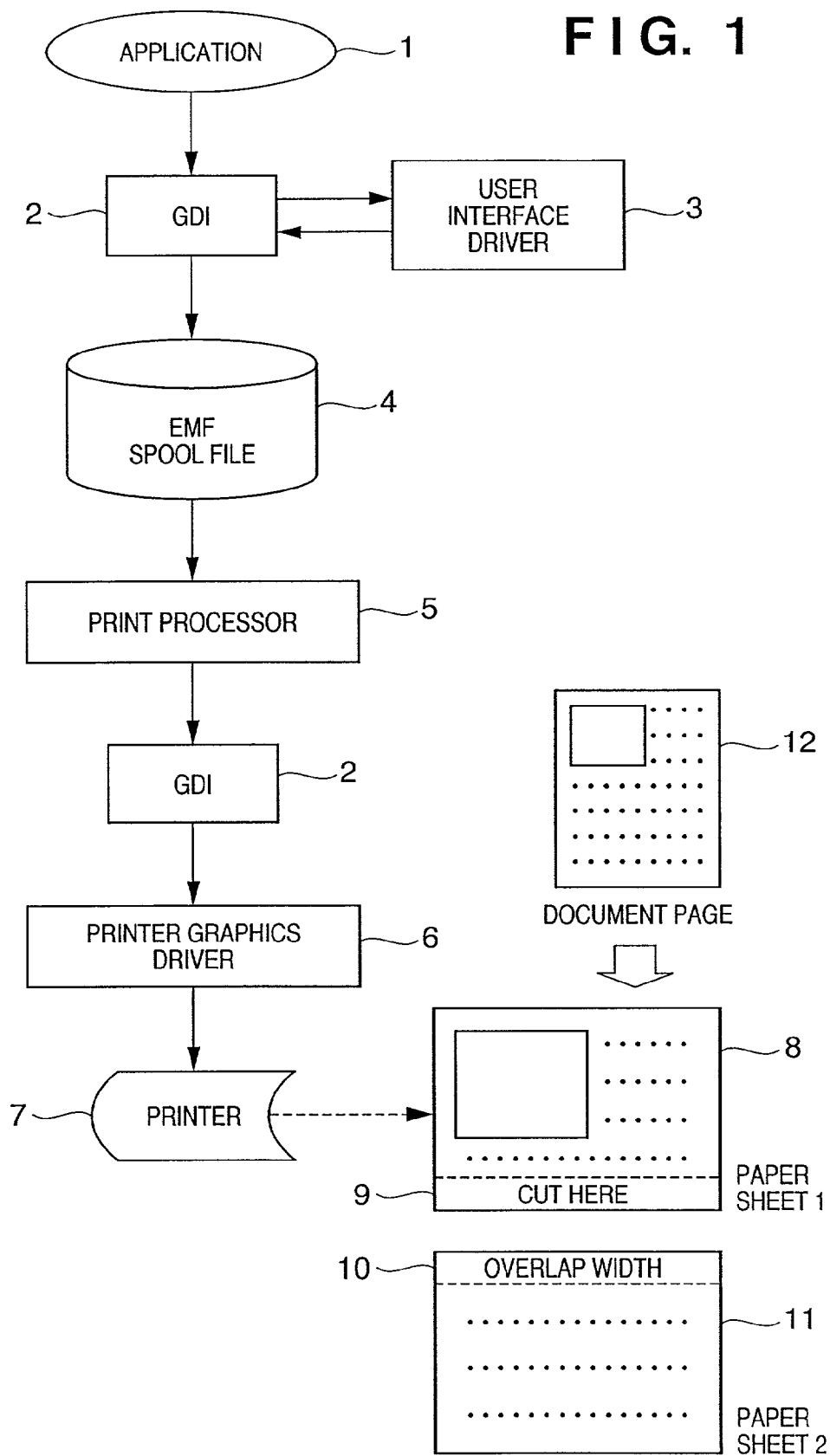
FIG. 1 is a block diagram of a printing system according to a first embodiment of the present invention.

FIG. 1 is a block diagram showing a printing system according to a first embodiment of the present invention. Referring to FIG. 1, modules associated with the implementation of the present invention, in particular, are a user interface driver 3 serving both as a pattern setting unit and a pattern page creating unit and a print processor 5 functioning as a pattern page combining unit. Note that although in this embodiment Windows is used as the operating system, the present invention is not limited to the Windows operating system.

In the printing system shown in FIG. 1, print data such as a document for information communication which is created by an application 1 in a personal computer or the like serving as a host is temporarily stored in an EMF spool file 4 through a GDI 2, this data is converted into bitmap data, and the bitmap data is supplied to a printer 7 to be printed. In this case, "GDI" indicates a graphic device interface, i.e., a graphic engine for Windows, and "EMF" stands for Enhanced Meta File, which is a logical storage format for drawing data in Windows. In the EMF spool file 4, print data is stored in the EMF form.

In general, the user interface driver 3 provides a function of setting a paper size, printing direction, and any other attributes which are used for printing. The user interface driver 3 in this embodiment also has a pattern setting unit for providing a function of setting attributes for the patterns of cut margins and margins to paste up for poster printing other than the attributes such as a paper size. When the attributes of a pattern are set, and the pattern uses an icon, the user interface driver 3 returns set values such as the name of a file in which an icon image is stored to the application 1. In addition, when a crossmark for facilitating positioning operation in cutting or pasting a margin portion, a dashed line indicating a margin, or the like is to be used, the user interface driver 3 returns the corresponding set values to the application 1.

The application 1 creates an arbitrary document and notifies the printing system of the start of printing to print the document. The GDI 2 notifies the user interface driver 3 of a print event indicating the start of printing by the application 1. Upon reception of the print event indicating the start of printing, the user interface driver 3, in place of the application 1, creates pages on which only patterns are drawn.

The application 1 then supplies the page data of the arbitrary document to the GDI 2 and continues print processing. The print data which has gone through the GDI 2 is stored in the EMF spool file 4. The EMF spool file 4 stores the drawing data of the pattern pages created by the user interface driver 3 and the drawing data of the document pages created by the application 1.

The print processor 5, in Windows, is a module for reading in print output information and print data from the EMF spool file 4 at the time of printing and supplies the print data to a printer graphics driver 6 page by page through the GDI 2, thereby performing printing. The print processor 5 in this embodiment also has the function of a pattern page combining unit, reads out the document data of pages to be printed and the pattern pages created by the user interface driver 3 from the EMF spool file 4, creates a new composite page by superimposing these pages, and supplies the resultant page to the GDI 2. In order to divide one page of the document data from the application 1 into a plurality of pages and print them, the print processor 5 repeats the operation of creating a composite page by superimposing the drawing data, obtained by enlarging a document page, and a pattern page in the pattern page combining processing a plurality of number of times.

The printer graphics driver 6 having the function of an image creating unit is a module for creating bitmap data from the graphic drawing command generated by the GDI 2 on the basis of the print data of the composite page supplied from the print processor 5. The printer graphics driver 6 supplies the created bitmap data to the printer 7 through a data transmitting unit (not shown).

The printer 7 serving as an output device has a function of printing, on a paper sheet 8, for example, the bitmap data obtained by superimposing a pattern page 9 and the image formed by enlarging a page 12 of the print data supplied from the printer graphics driver 6.

In this embodiment, a character string is set as an attribute of a pattern as follows. A pattern page on which a character string is drawn is created in advance by the user interface driver 3 and stored in the EMF spool file 4. The print processor 5 then creates the print data of the composite page by superimposing the print data of the pattern page and the print data of a document page from the application 1, and supplies the print data to the printer graphics driver 6 to create bitmap data in which the document page to be printed and the pattern page are superimposed on each other. The print processor 5 supplies this bitmap data to the printer 7.

FIG. 1 shows a case wherein a document page from the application 1 is divided into two pages (i.e., the print data is enlarged twice). The user interface driver 3 creates the pattern page 9 on which only the character string "cut here" is drawn and a pattern page 10 on which only the character string "overlap width" is drawn, as pattern pages, before printing by the application 1. The print processor 5 creates a composite page by superimposing the drawing data, obtained by enlarging a document page from the application 1, and the pattern page 9. Likewise, the print processor 5 creates a composite page by superimposing the drawing data, obtained by enlarging a document page from the application 1, and the pattern page 10. The print processor 5 then supplies these composite pages to the printer graphics driver 6. In this manner, two paper sheets 8 and 9 are printed out from the printer 7 serving as an output device. FIG. 1 shows an example of two-part poster printing. However, the same printing method is applied to printing with an arbitrary number of parts. As will be described below, the positions of "cut here" and "overlap width" are set in accordance with the number of parts.

Figure 2:
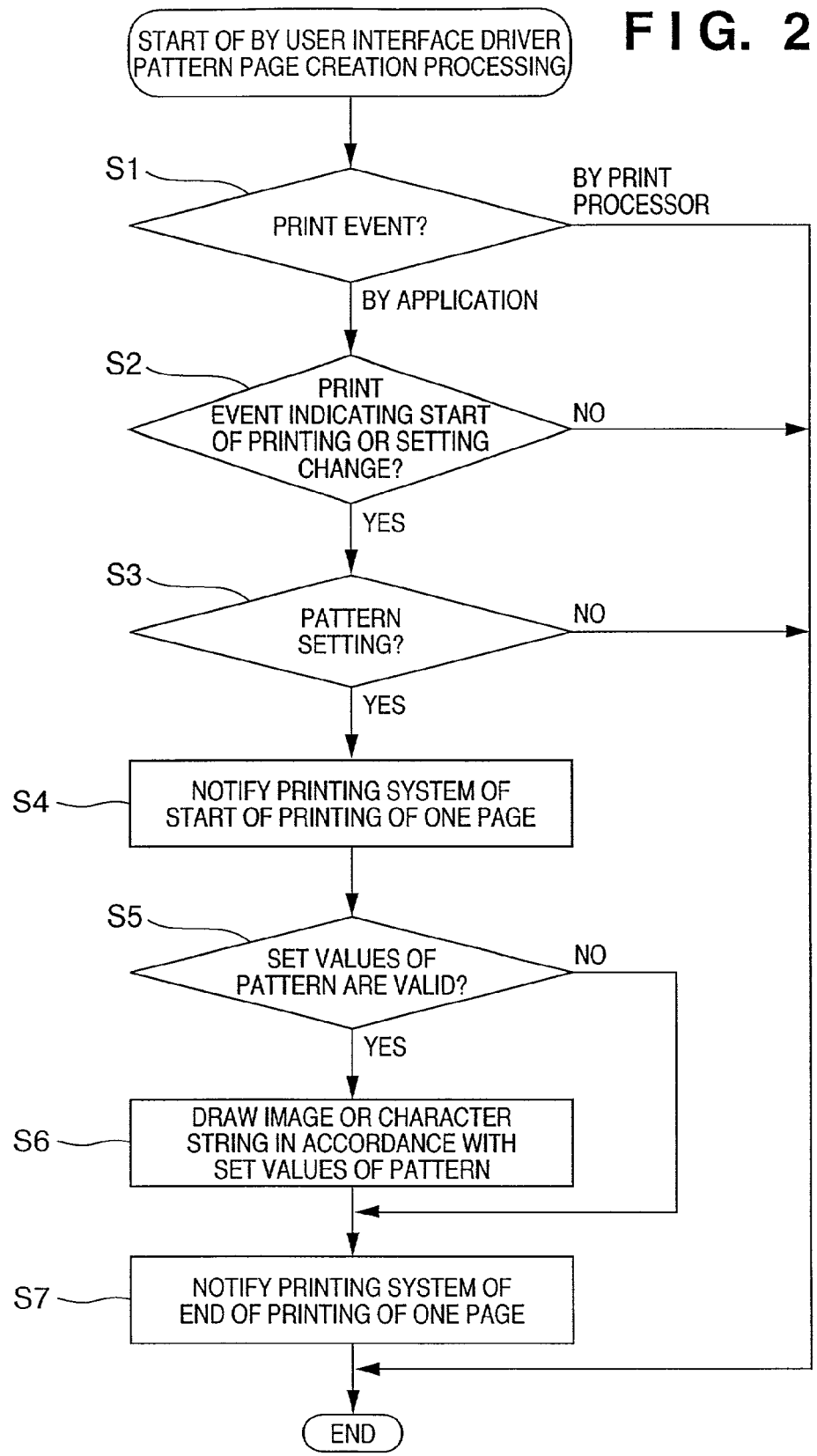
FIG. 2 is a flow chart showing a pattern page creating method executed by a user interface driver according to the first embodiment of the present invention.

Example of Operation Procedure in Printing System According to First Embodiment FIG. 2 is a flow chart showing the operation of the user interface driver 3 in the first embodiment. FIG. 3 is a flow chart showing the operation of the print processor 5 in the first embodiment. The overall operation of the printing system shown in FIG. 1 will be described with reference to FIGS. 2 and 3.

Pattern page creation processing will be described with reference to FIG. 2. The user interface driver 3 performs pattern page creation processing upon reception of a print event from the GDI 2.

In step S1, it is checked whether the print event notified by the GDI 2 is one generated by the print processor 5 or application 1. If the print event is one generated by the print processor 5, the user interface driver 3 terminates the processing without performing any operation. If the print event is one generated by the application 1, the flow advances to step S2. In step S2, the type of print event is checked. If the print event indicates the start of printing, the flow advances to step S3. Otherwise, the user interface driver 3 terminates processing without performing any operation. In step S3, it is checked whether pattern settings have been made as print settings. If pattern settings have been made, the flow advances to step S4. If no pattern setting has been made, the processing is terminated.

In step S4, in place of the application 1, the user interface driver 3 notifies the printing system of the start of printing of one page in order to draw/create a pattern page. Since the printing system handles this notification as a notification from the application 1, the pattern page drawn by the user interface driver 3 afterward is handled like a document page drawn by the application 1. In step S5, it is checked whether the set values of the attributes of the pattern set by the user are valid. If, for example, an icon is used as a pattern, it is checked whether a corresponding image file exists. If the set values are valid, the flow advances to step S6. If the set values are invalid, the flow advances to step S7 without drawing any pattern, and a page having no pattern drawn is created.

In step S6, in place of the application 1, the user interface driver 3 properly draws various patterns on a cut margin and margin to paste up, respectively, via the GDI 2 in accordance with the set values of the attributes of the patterns. If, for example, a character string is designated as a pattern, the character string is drawn in accordance with set values concerning a font. If an image is used as a pattern, the image is drawn after enlargement/reduction processing, density conversion, and the like. In step S7, in place of the application 1, the user interface driver 3 notifies the printing system of the end of printing of one page. As a consequence, the pattern pages drawn and created by the user interface driver 3 are stored in the EMF spool file 4.

Pattern page combining processing will be described next with reference to FIGS. 3A and 3B. The print processor 5 performs pattern page combining processing for each print job.

In step S21, it is checked whether pattern settings have been made. If pattern settings have been made, the print data of a page stored in the EMF spool file 4 is checked. If no pattern setting has been made, the flow advances to step S26 to start normal printing.

Steps S22 to S25 constitute a loop for recording the page numbers in the spool file and the corresponding document page numbers from the application 1 on the basis of the setting differences between the respective pages stored in the EMF spool file 4. In step S23, the print settings of two consecutive page data are compared to check whether any print setting has been changed on the way. If no change has been made, the flow advances to step S25. If a change has been made, the flow advances to step S24. In step S24, the page number in the EMF spool file 4 is stored in the corresponding list of the application 1, and the number of pattern pages in which spool page numbers to be checked next are inserted by the user interface driver 3 is skipped.

When all the page data in the EMF spool file 4 are checked in step S25, the flow advances to step S26. If there is any page that is not checked, the flow returns to step S22 to check whether the print settings for the next page have been changed, thus repeating the loop.

In step S26, the print processor 5 notifies the printing system of the start of printing to actually print the page created by the print processor 5.

Steps S27 to S33 constitute a loop for printing each document page up to the final physical page to be printed. Print processing of each physical page is continued in step S28. After all the physical pages are printed, the flow advances to step S34 to notify the printing system of the end of print processing.

Print processing of each physical page is started from step S28, in which the printing system is notified first of the start of printing of one page. In step S29, the document page number from the application 1 which corresponds to the number of the physical page to be printed is calculated, the page number in the EMF spool file 4 which corresponds to the document page number from the application 1 is acquired from the above page correspondence list, and the document page is read out from the EMF spool file 4 to be enlarged/drawn.

In step S30, it is checked whether pattern settings have been made for the document page to be printed. If no pattern setting has been made, the flow advances to step S32 to terminate physical page printing. If pattern settings have been made, the flow advances to step S31. In step S31, the pattern page number in the EMF spool file 4 which corresponds to the number of the document page from the application 1 which is to be printed is acquired from the page correspondence list, and the pattern page is read out from the EMF spool file 4 to be drawn. Thereafter, the flow advances to step S32 to terminate physical page printing. In step S32, the printing system is notified of the end of printing of one page to terminate physical page printing.

With the above operation, the pattern page combining processing is terminated. Every time the print processor 5 creates a composite page and notifies the end of a physical page in step S32, the printer graphics driver 6 converts the composite page into bitmap data, and the bitmap data is supplied to the printer 7 through predetermined data transmission processing (not shown) to print the composite page.

Example of Printing in First Embodiment

Figure 4:
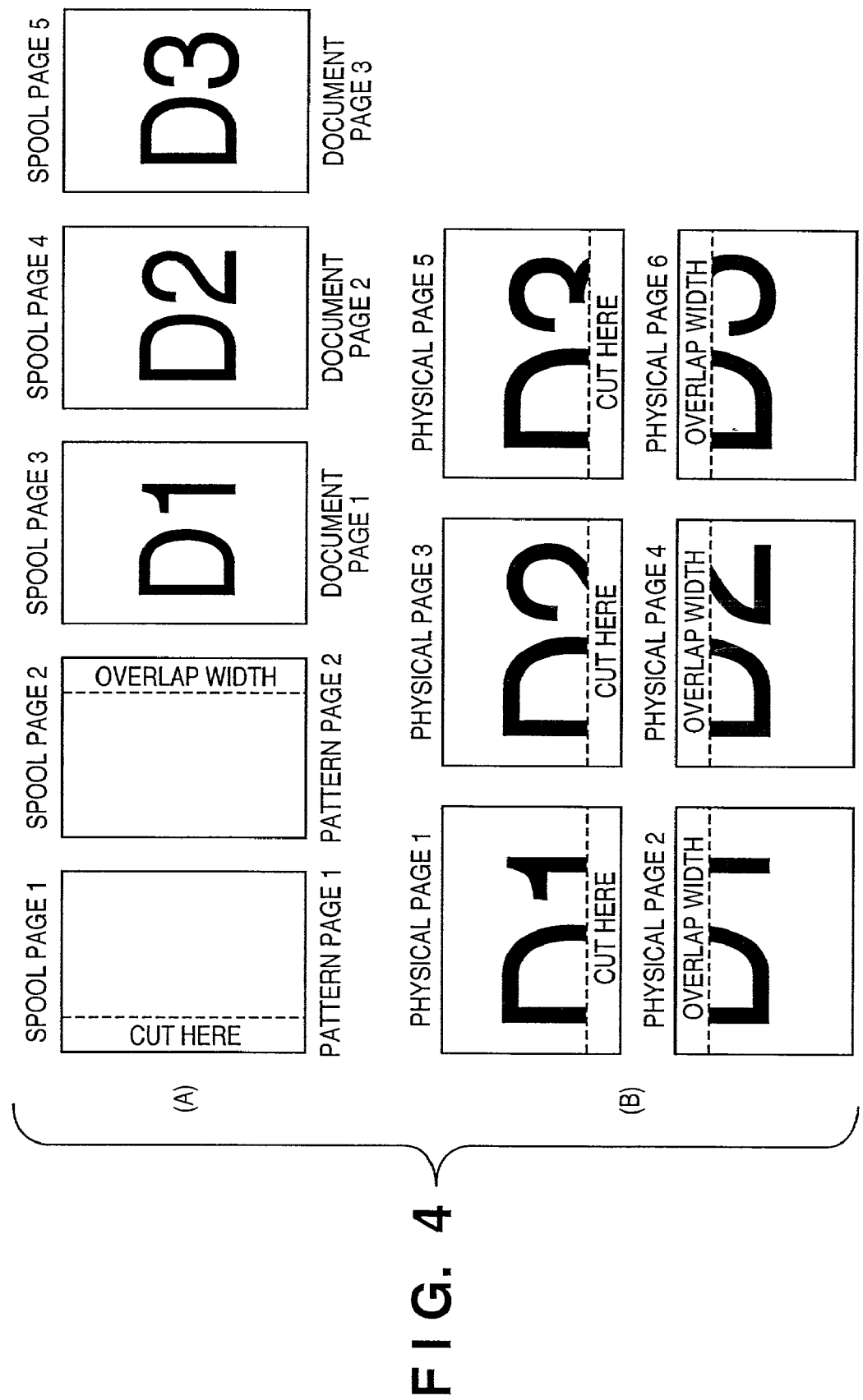
FIG. 4 is a conceptual view showing the relationship between the states of pattern and document pages stored in an EMF spool file and the physical pages printed on paper sheets according to the first embodiment of the present invention.

FIG. 4 is a conceptual view showing the relationship between the states of pattern and document pages stored in the EMF spool file 4 and physical pages printed on paper sheets. Assume that printing is performed under the conditions that the application 1 prints three document pages without changing any print settings in the process of printing, and character string patterns are designated in cut areas and overlap width areas of two-part posters are designated.

(A) of FIG. 4 shows the order of pages stored in the EMF spool file 4. The first two pages stored in the EMF spool file 4 are the pattern pages created by the user interface driver 3, and the document pages created by the application 1 are stored as the third to fifth pages in the EMF spool file 4. When the print processor 5 uses spool pages 1 and 2 as optimal pattern pages for the respective document pages and enlarges/draws each document page, the print processor 5 superimposes/prints spool page 1 as a pattern page on the upper half of the document page, and also superimposes/draws spool page 2 as a pattern page on the lower half of the document page, thereby obtaining physical pages 1 to 6 as print results, as shown in (B) of FIG. 4.

Figure 5:
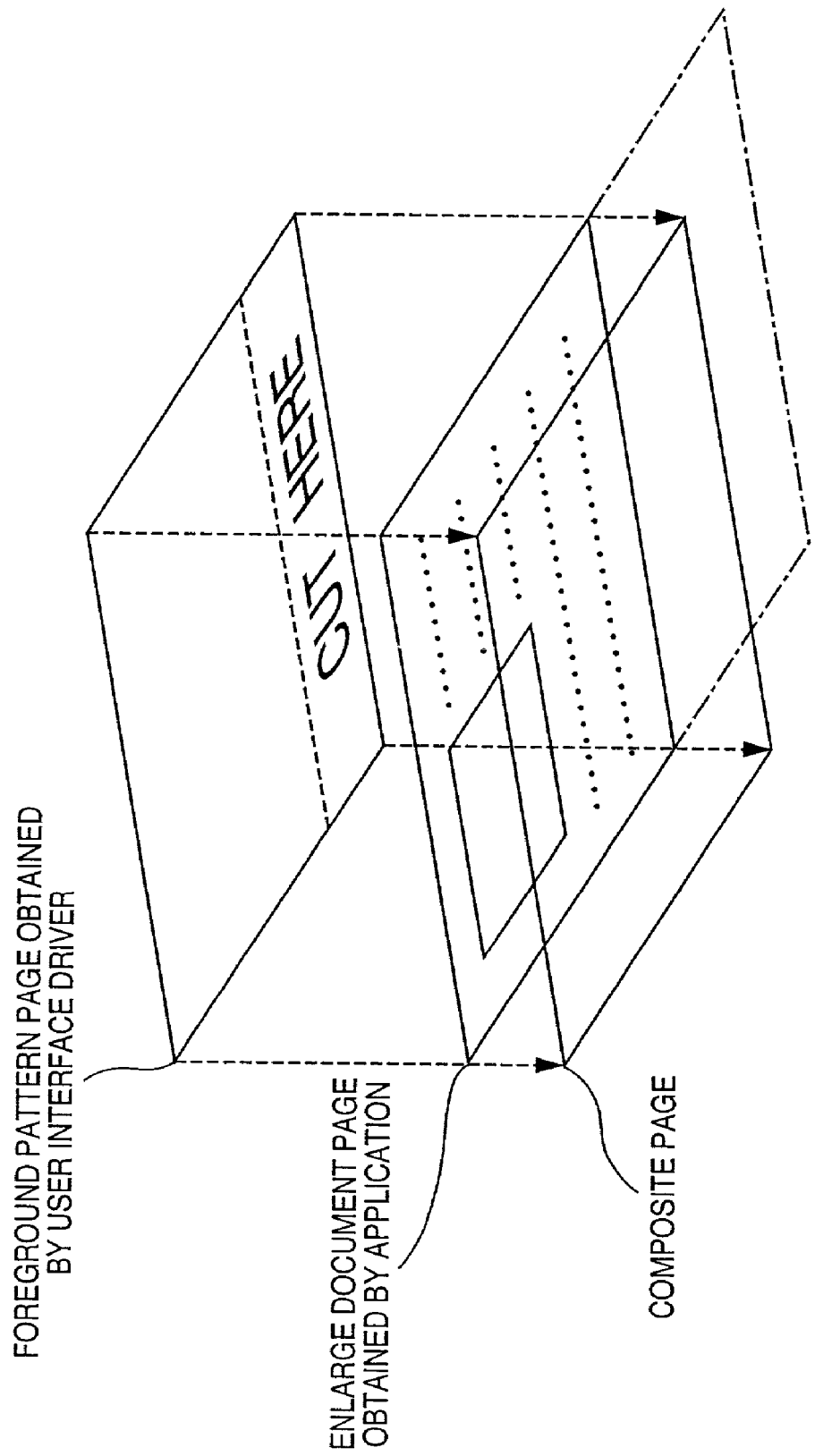
FIG. 5 is a conceptual view showing a print processor for drawing/superimposing a pattern on a document page according to the first embodiment of the present invention.

FIG. 5 is a conceptual view showing pattern page combining processing by the print processor 5 which superimposes/draws pattern pages on document pages. Assume in this case that the upper half of a document page from the application 1 is printed by two-part poster printing.

First of all, the document page from the application 1 is enlarged/drawn. The pattern page is then superimposed/drawn on the document page to create a composite page to be printed. FIG. 5 shows the character string "cut here" in the cut area of the pattern page and the crossmark indicting the cut mark, although, an image may be used instead of the character string. The lower half of the document page (not shown) has an overlap width area, and the character string "overlap width" or the like is used. In poster printing with more than two parts, both a cut area and an overlap width area may exist on one pattern page.

Example of Hardware Configuration of Printing System According to First Embodiment A hardware block diagram of the printing system according to this embodiment will be described next.

Figure 6:
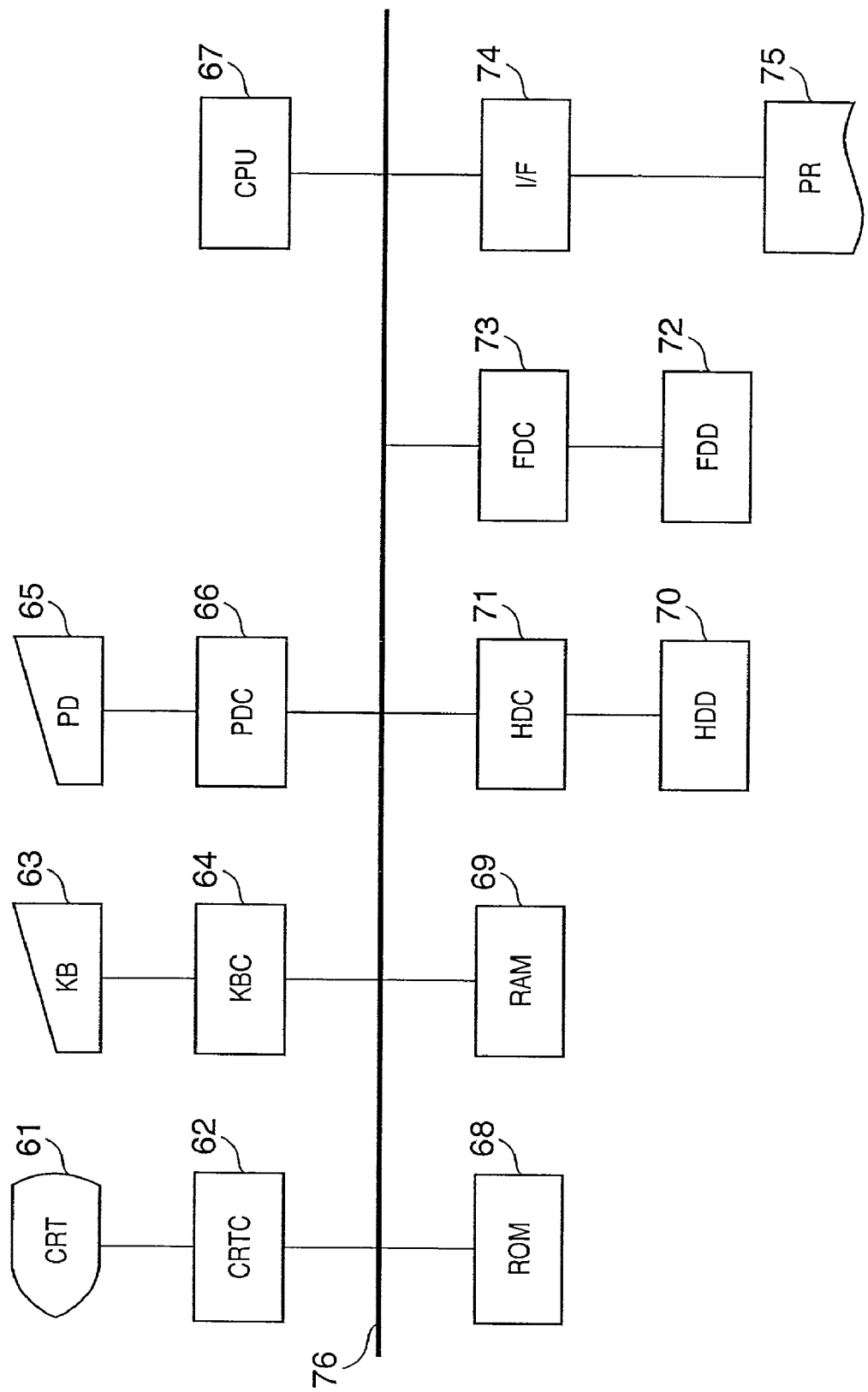
FIG. 6 is a hardware block diagram of a printing system according to the present invention, and more specifically, the arrangement of the printing system according to the first embodiment.

FIG. 6 is a block diagram showing the hardware configuration of the printing system according to this embodiment.

Referring to FIG. 6, reference numeral 61 denotes a CRT display device which shows a property setting window and the like provided by the user interface driver shown in FIG. 1; 62, a CRTC serving as a display device controller; 63, a data input device such as a keyboard; 64, a keyboard controller; 65, a coordinate input device such as a pointing device; and 66, a pointing device controller.

Figure 3A:
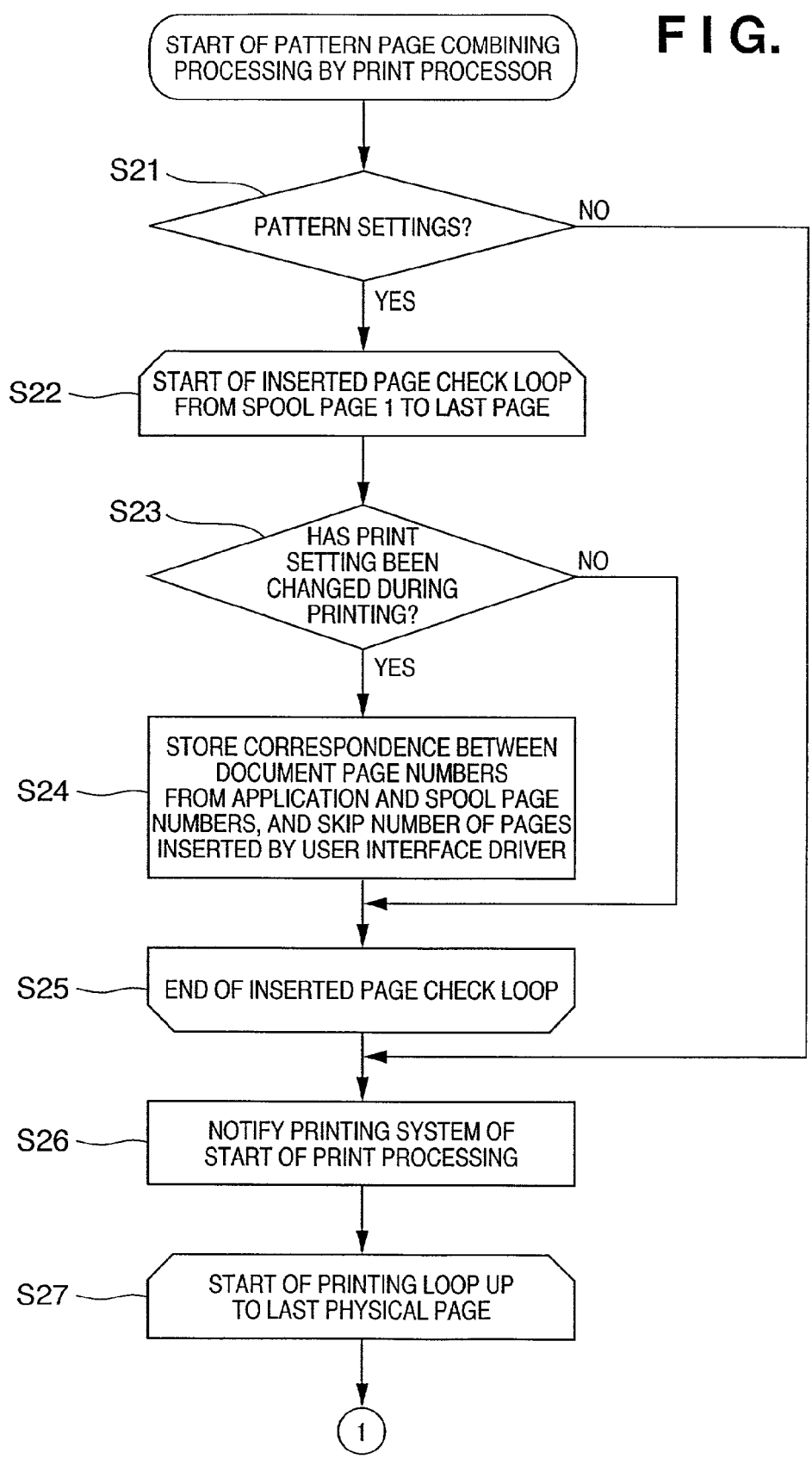
FIGS. 3A and 3B are flow charts showing a pattern page combining method executed by a print processor according to the first embodiment of the present invention.
Figure 3B:
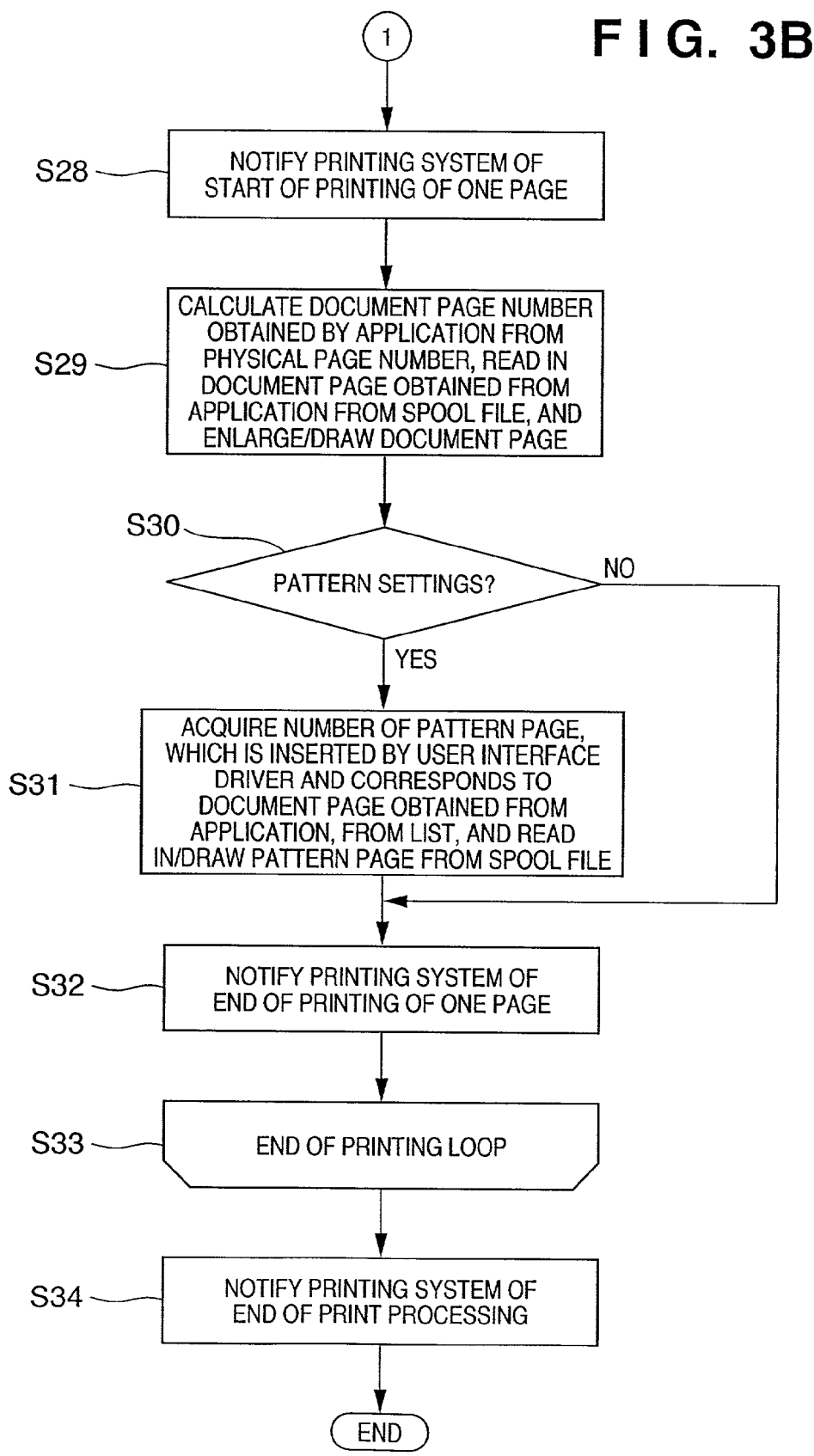

Reference numeral 67 denotes a CPU for controlling the overall system; 68, a ROM storing a boot program and the like; and 69, a RAM which is used to store an OS, various application programs, and a printer driver program associated with the system configuration in FIG. 1 and the flow charts of FIGS. 2, 3A and 3B and also used as a work area.

Reference numeral 70 denotes a hard disk unit storing an OS, various application programs, the printer driver program associated with the system configuration in FIG. 1 and the flow charts of FIGS. 2, 3A and 3B, font data, data files (images used as patterns), and the like; 71, a hard disk controller; 72, a floppy disk unit serving as a unit for driving a portable storage medium; 73, a floppy disk controller; 74, an interface which is connected to a printing apparatus 75 such as an ink-jet printer through an interface cable; and 76, a bus for connecting the respective devices. Note that the portable storage medium is not limited to a floppy disk and may be a CD, MO, DVD, magnetic card, optical card, memory card, or the like.

When power is provided to this system, the CPU 67 is activated in accordance with the boot program stored in the ROM 68 to load the OS from the hard disk unit 70, thus setting a standby state with respect to operation by an operator. Assume that the CPU 67 has received a print instruction or an instruction to change a print setting in the printer driver from the operator through the KB 63 or PD 65 and an application. In this case, the printer driver program stored in the hard disk unit 70 is loaded into the RAM 69 to execute processing in this embodiment.

Effects of First Embodiment

As described above, the print processor 5 superimposes the document page to be printed, created by the application 1, and the pattern page created by the user interface driver 3, and then supplies the resultant page to the printer graphics driver 6. Therefore, the number of pattern pages is not dependent on the number of document pages, and the capacity of the storage area required by the EMF spool file 4 need not be large. Furthermore, under a network environment, the number of pattern pages remains unchanged even if the number of document pages increases, and hence the load imposed on the network can be reduced. In addition, since pattern pages are created by the user interface driver 3 on the client side, printing can be done even without a font and the like which are required to draw patterns in executing the printer graphics driver 6 on the server side.

First Modification of First Embodiment

Paper sheets on which documents should be printed may sometimes vary in size, and documents may be printed on paper sheets some of which differ in size from the rest. In such a case, if processing like that described in the first embodiment is performed, since the pattern page created by the user interface driver 3 first is always used without changing the size, the position of the pattern may shift or part of the pattern may protrude, producing an undesired print result. If, for example, the direction of a paper sheet is changed in the process of printing, part of the pattern may not be printed. This modification will exemplify the case wherein posters can be properly printed even with various paper sizes.

A system according to the first modification of the first embodiment will be described with reference to FIG. 1. The first modification differs from the first embodiment in that the user interface driver 3, in place of the application 1, creates pattern pages when a print event indicating the start of printing is notified and a print event indicating a change in print setting is notified. The print processor 5 superimposes an optimal pattern page on a document created by the application 1 upon a change in print setting.

The operation of the user interface driver in the first modification will be described next with reference to FIG. 2. The operation in step S1 is the same as that in the first embodiment. In step S2, the type of a print event is determined. If the event is a print event indicating the start of printing or a print event indicating a change in print setting, the flow advances to step S3. Otherwise, the processing is terminated without any operation. In the case of a print setting change event, since pattern page insertion processing is performed immediately after a print setting is changed, the application 1 can draw pages by using the changed print settings. The remaining steps are the same as those in the first embodiment.

Figure 7:
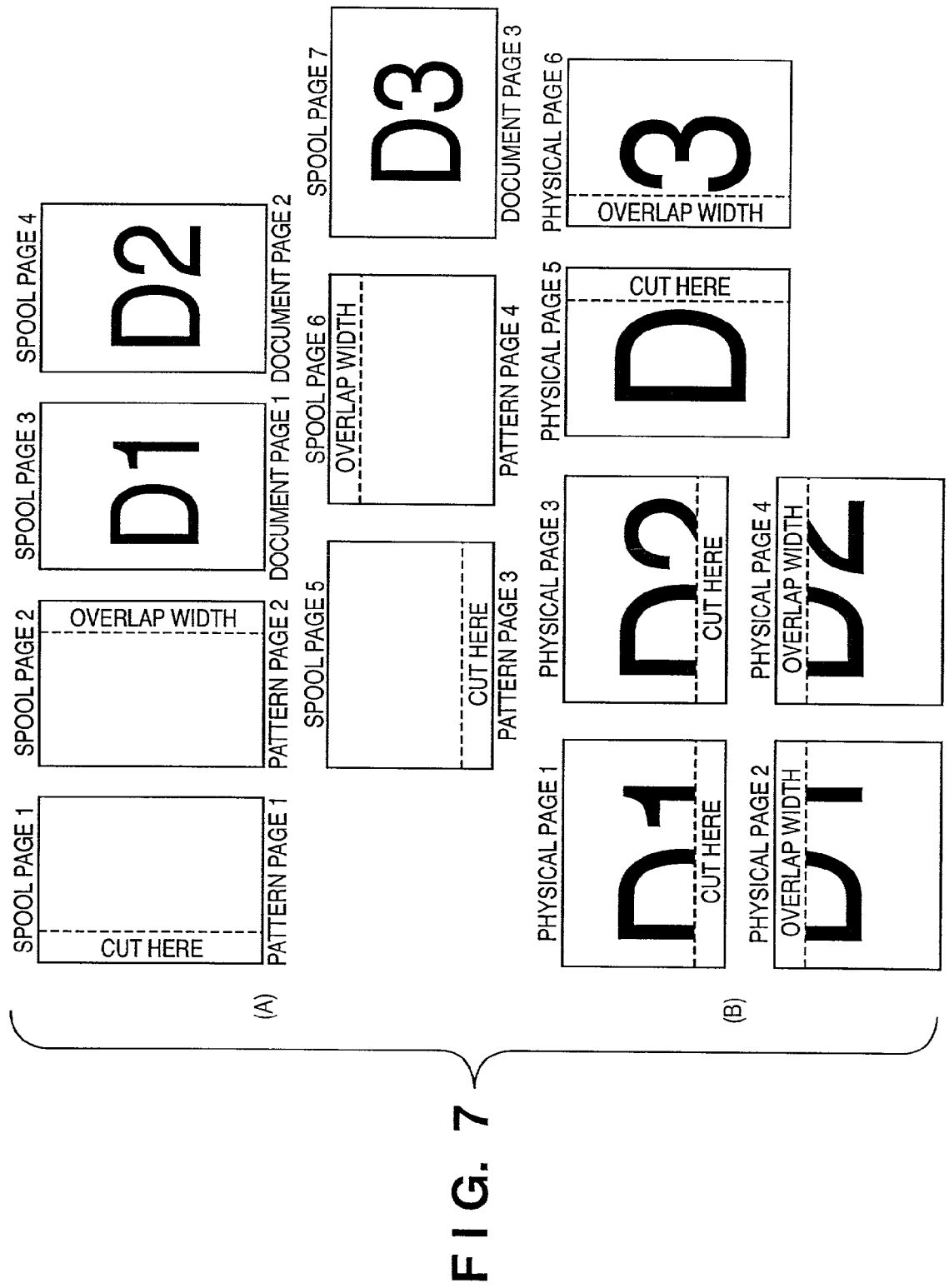
FIG. 7 is a conceptual view showing the relationship between the states of pattern and document pages stored in an EMF spool file and the physical pages printed on paper sheets according to the first embodiment of the present invention.

FIG. 7 is a conceptual view showing the relationship between the states of pattern and document pages stored in the EMF spool file 4 and the physical pages to be printed on paper sheets when print settings are changed in the process of printing. In this case, printing is performed under the conditions that the application 1 changes the print settings between document page 2 and document page 3 during printing, and prints document page 3 upon changing the direction of the paper sheet, and two-part poster printing and character string patterns are designed as print settings.

(A) of FIG. 7 shows the order of pages stored in the EMF spool file 4. The first two pages stored in the spool file are the pattern pages which are created by the user interface driver 3 and correspond to a print start event. Document pages 1 and 2 created by the application 1 are stored as spool pages 3 and 4 in the EMF spool file 4, and the pattern pages which are created by the user interface driver 3 and correspond to a print setting change event are stored as spool pages 5 and 6. Finally, document page 3 is stored as spool page 7. In this case, since the application 1 changes the print settings between document page 2 and document page 3 to change the direction of a paper sheet, pattern pages corresponding to document page 3 are stored as spool pages 5 and 6. In this case, since the user interface driver 3 is notified that the direction of paper sheets is changed by the print setting change event, the character strings can be printed in a well-balanced state even if the paper size is changed. The print processor 5 uses spool pages 1 and 2 for document pages 1 and 2 as optimal pattern pages for the respective document pages, and also uses spool pages 5 and 6 for document page 3. The print processor 5 then superimposes/draws the pattern pages on the respective document pages to obtain physical pages 1 to 6 as the print results shown in (B) of FIG. 7. In addition, even when the paper size or the position of a pattern is changed, a pattern page can be created at a desired position, and a good output result can be obtained by making the user interface driver 3 properly draw the pattern in accordance with a print setting change event.

Although not shown in FIG. 7, if, for example, each output paper sheet in (B) of FIG. 7 has a size twice as large as that of a document page stored from the application 1 into the EMF spool file 4, the document can be output onto one paper sheet without "overlap width" and "cut here" in (B) of FIG. 7. Assume that an output paper sheet is half the size of a document page. In this case, even when poster printing is to be performed with a double size, one document page is printed by using four paper sheets, and the positions of "cut here" and "overlap width" differ from those in the case wherein paper sheets are equal in size to document pages. In addition, if a document page differs in size from a paper sheet, e.g., the document page and print sheet respectively have A and B sizes, paper sheets are laid out such that poster printing is done within a plurality of paper sheets. Even with such different sizes, "cut here" and "overlap width" can be properly arranged in accordance with the layout of paper sheets. These techniques are also incorporated in the present invention.

Effect of First Modification

As described above, the user interface driver 3 creates/processes pattern pages in accordance with paper sizes and a pattern layout setting. Even if, therefore, the paper size changes or various changes in state occur, patterns can be printed at proper positions in accordance with the changes.

Second Modification of First Embodiment

When the techniques in the first embodiment and the first modification are used, the total number of pattern pages created by the user interface driver 3 does not depend on the number of document pages created by the application 1 but increases in proportion to the number of parts in poster printing. In, for example, 16-part poster printing, since the user interface driver 3 creates 16 pattern pages, the size of the EMF spool file 4 increases. This modification will exemplify the case wherein the number of pattern pages created by the user interface driver 3 is made independent of the number of parts in poster printing.

Figure 8:
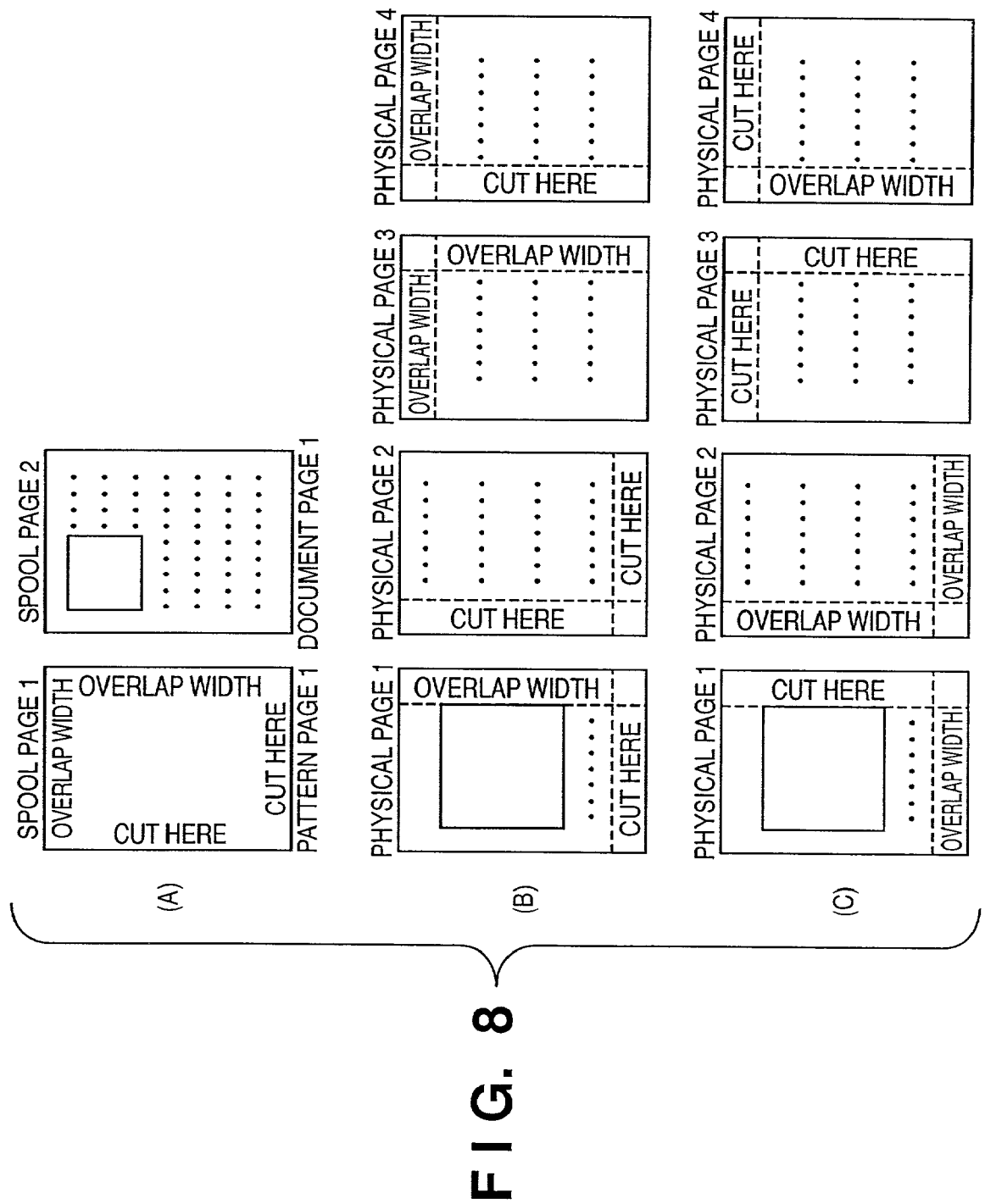
FIG. 8 is a conceptual view showing the relationship between the states of pattern and document pages stored in an EMF spool file and the physical pages printed on paper sheets according to the first embodiment of the present invention.

FIG. 8 is a conceptual view showing the relationship between the states of pattern and document pages stored in the EMF spool file 4 and the physical pages to be printed on paper sheets when print settings are changed in the process of printing. Assume that printing is to be done under the conditions that the application 1 prints one document page, and four-part poster printing and character string patterns are designated as print settings.

(A) of FIG. 8 shows the order of pages stored in the EMF spool file 4. The first page stored in the EMF spool file 4 is the pattern page which is created by the user interface driver 3 and corresponds to a print start event. The document page created by the application 1 is then stored. When the print processor 5 uses spool page 1 created by the user interface driver 3 as an optimal pattern page for document page 1 and superimposes the pattern page on the enlarged document page, the print processor 5 performs clipping so as not to reflect drawing data in areas other than a necessary overlap width area and cut area. In this case, the print processor 5 may draw boundary lines of the overlap width area and cut area in performing pattern page combining processing. By performing pattern page combining processing in the above manner, physical pages 1 to 4 as print results shown in (B) of FIG. 8 can be obtained.

Figure 9:
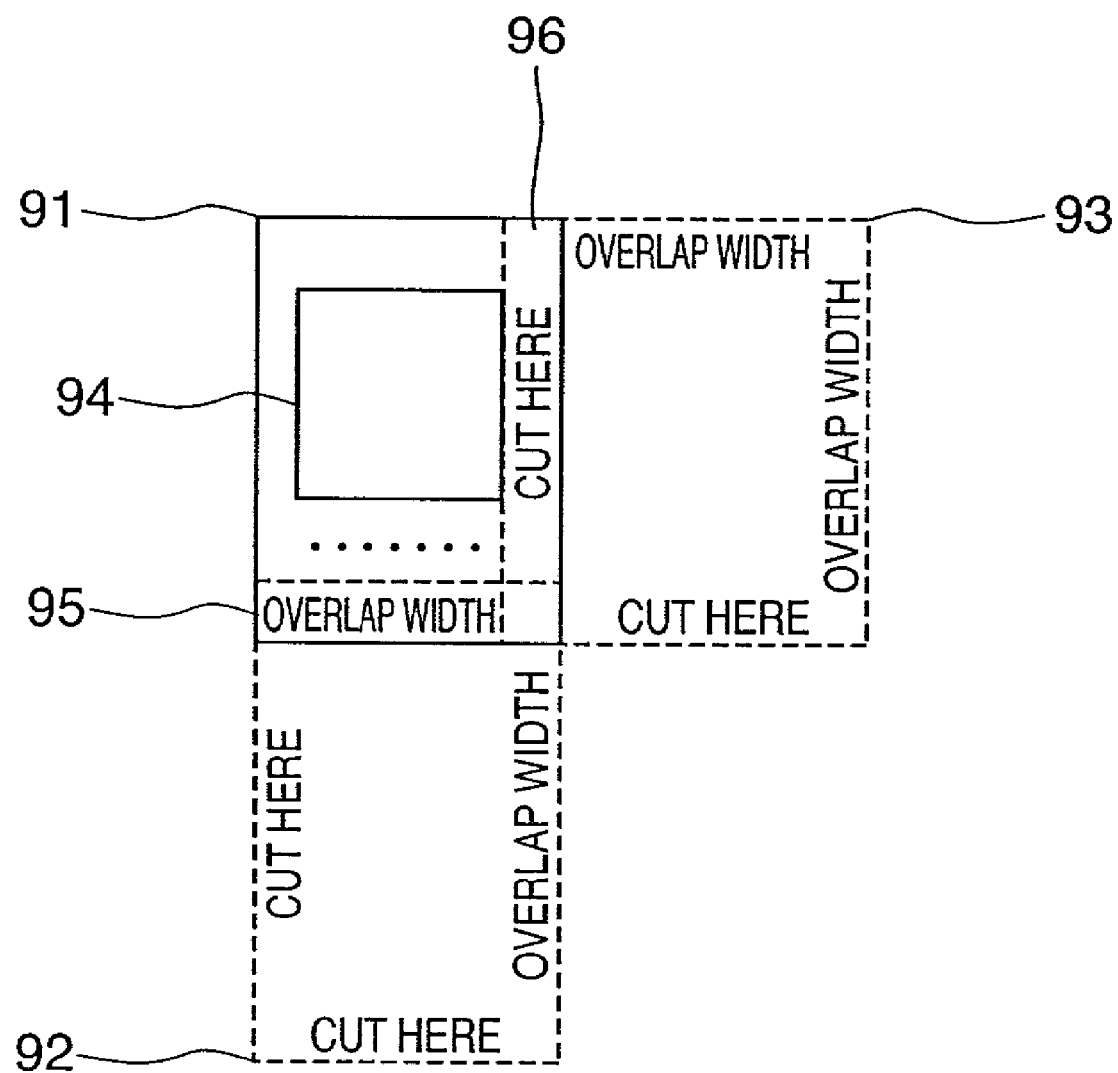
FIG. 9 is a conceptual view showing pattern page combining processing by a printer processor which superimposes/draws a pattern on a document page according to the first embodiment of the present invention.

If the print processor 5 cannot perform clipping due to limitations on the printing system, pattern pages may be translated when they are superimposed, as shown in FIG. 9. Referring to FIG. 9, reference numeral 91 denotes a composite page created by the print processor upon superimposition processing; 92, a pattern page created by the user interface driver 3; 94, an enlarged document page; and 95, an overlap width area. The print processor 5 positions a pattern page at the position indicated by "92" and superimposes it such that the pattern page is superimposed on only the overlap width area in pattern page combining processing. Reference numeral 96 denotes a cut area. The print processor 5 positions a pattern page at the position indicated by "93" and superimposes it such that the pattern page is superimposed on only the cut area. With this control, a good result can be obtained even if clipping cannot be done, and physical pages 1 to 4 as print results shown in (C) of FIG. 8 can be obtained. In this case, the print processor 5 may draw the boundary lines of the overlap width area and cut area in pattern page combining processing.

Note that since the system and the flows of other processes in the second modification are the same as those in the above embodiment, a description thereof will be omitted.

Effects of Second Modification

As described above, since the user interface driver 3 creates pattern pages having patterns drawn in cut areas and overlap width areas on the four sides of the pages, only one pattern page is created at the time of the start of printing or the occurrence of a print setting change regardless of the number of parts in poster printing, thereby suppressing an increase in the size of an EMF spool file. In addition, according to this technique, even if the print processor 5 cannot perform clipping due to limitations on the printing system, an increase in the number of pattern pages can be suppressed.

Effects of First Embodiment

According to this embodiment, there are provided a print data creating method and a printing system for the method, in which when print data including print data for information communication and print data for function display (e.g., an overlap width and cut margin) is to be printed, the required capacity of a storage area can be reduced, the load imposed on the network can be reduced, and printing can be done even without a font and the like on the server side.

More specifically, the print processor 5 superimposes the document page which is to be printed and created by the application 1 and the pattern page created by the user interface driver 3, and supplies the resultant page to the printer graphics driver 6. With this operation, the number of pages does not depend on the number of document pages, and the capacity of the storage area which is required by the EMF spool file 4 need not be large. In addition, under a network environment, the number of pattern pages remains unchanged even if the number of document pages increases, and hence the load imposed on the network can be reduced. Furthermore, since pattern pages are created by the user interface driver 3 on the client side, printing can be done even without a font and the like which are required to draw patterns in executing the printer graphics driver 6 on the server side.

In addition, the user interface driver 3 creates/processes pattern pages in accordance with paper sizes and a pattern layout setting. Even if, therefore, the paper size changes or various changes in state occur, patterns can be printed at proper positions in accordance with the changes.

Furthermore, since the user interface driver 3 creates pattern pages having patterns drawn in cut areas and overlap width areas on the four sides of the pages, only one pattern page is created at the time of the start of printing or the occurrence of a print setting change regardless of the number of parts in poster printing, thereby suppressing an increase in the size of an EMF spool file. In addition, according to this technique, even if the print processor 5 cannot perform clipping due to limitations on the printing system, an increase in the number of pattern pages can be suppressed.

Example of Stamp Printing according to Second Embodiment

Example of Arrangement of Printing System according to Second Embodiment

FIG. 10 is a block diagram showing a printing system according to the second embodiment of the present invention. Referring to FIG. 10, modules associated with the present invention are a user interface driver 103 serving both as a pattern setting unit and a pattern page creating unit and a print processor 105 serving as a pattern page combining unit. Note that in this embodiment, Windows is used as an operating system. However, the present invention is not limited to this.

In the printing system shown in FIG. 10, print data such as a document created by an application 101 in a personal computer or the like serving as a host is temporarily stored in an EMF spool file 104 through a GDI 102, this data is converted into bitmap data, and the bitmap data is supplied to a printer 107 to be printed. In this case, "GDI" indicates a graphic device interface, i.e., a graphic engine for Windows, and "EMF" stands for Enhanced Meta File, which is a logical storage format for drawing data in Windows. In the EMF spool file 104, print data is stored in the EMF form.

In general, the user interface driver 103 provides a function of setting a paper size, printing direction, and any other attributes which are used for printing. The user interface driver 103 in the present invention also has a pattern setting unit for providing a function of setting attributes of patterns such as a stamp, other than the attributes such as a paper size. When the attributes of a pattern are set and a character string is used, set values such as a font name, the number of points, the color of a frame line, a rotational angle, and a position are returned to the application 101. If a pattern using an image is to be used, set values such as a file name, an enlargement ratio, a density, a position, and a layout method are returned to the application 101.

The application 101 creates an arbitrary document and notifies the printing system of the start of printing to print the document. The GDI 102 notifies the user interface driver 103 of a print event indicating the start of printing by the application 101. Upon reception of the print event indicating the start of printing, the user interface driver 103, in place of the application 1, creates pages on which only patterns are drawn.

Ads, The application 101 then supplies the page data of the arbitrary document to the GDI 102 and continues print processing. The print data which has gone through the GDI 102 is stored in the EMF spool file 104. The EMF spool file 104 stores the drawing data of the pattern pages created by the user interface driver 103 and the drawing data of the document pages created by the application 101.

The print processor 105, in Windows, is a module for reading in print output information and print data from the EMF spool file 104 at the time of printing and supplies the print data to a printer graphics driver 106 page by page through the GDI 102, thereby performing printing. The print processor 105 in this embodiment also serves as a pattern page combining unit, reads out the document data of pages to be printed and the pattern pages created by the user interface driver 103 from the EMF spool file 104, creates a new composite page by superimposing these pages, and supplies the resultant page to the GDI 102.

The printer graphics driver 106 serving as an image creating unit is a module for creating bitmap data from the graphic drawing command generated by the GDI 102 on the basis of the print data of the composite page supplied from the print processor 105. The printer graphics driver 106 supplies the created bitmap data to a printer 107 through a data transmitting unit (not shown).

The printer 107 serving as an output device has a function of printing, on a paper sheet 108, bitmap data obtained by superimposing a stamp 110 on a page 109 of print data transferred from the printer graphics driver 106. The print result on the paper sheet 108 in FIG. 10 exemplifies the case wherein the print processor 105 superimposes a pattern page on a document page. This pattern will be called a foreground pattern. The print result on a paper sheet 111 in FIG. 10 exemplifies the case wherein the print processor 105 superimposes a document page on a pattern page. This pattern will be called a background pattern.

Although not shown, foreground and background patterns can be used together in the following manner. The attributes of foreground and background patterns are independently set, and the user interface driver 103 creates foreground and background pattern pages. The print processor 105 then superimposes the background pattern page, the document page from the application, and the foreground pattern page. Alternatively, the user interface driver 103 may create pluralities of foreground and background pattern pages instead of creating them one by one, and the print processor 105 may superimpose these pattern pages and a document page.

In this embodiment, a character string is set as an attribute of a pattern as follows. A pattern page on which a character string is drawn is created in advance by the user interface driver 103 and stored in the EMF spool file 104. The print processor 105 then creates the print data of the composite page by superimposing the print data of the pattern page and the print data of a document page from the application 101, and supplies the print data to the printer graphics driver 106 to create bitmap data in which the document page to be printed and the pattern page are superimposed on each other. The print processor 105 supplies this bitmap data to the printer 107.

Figure 11A:
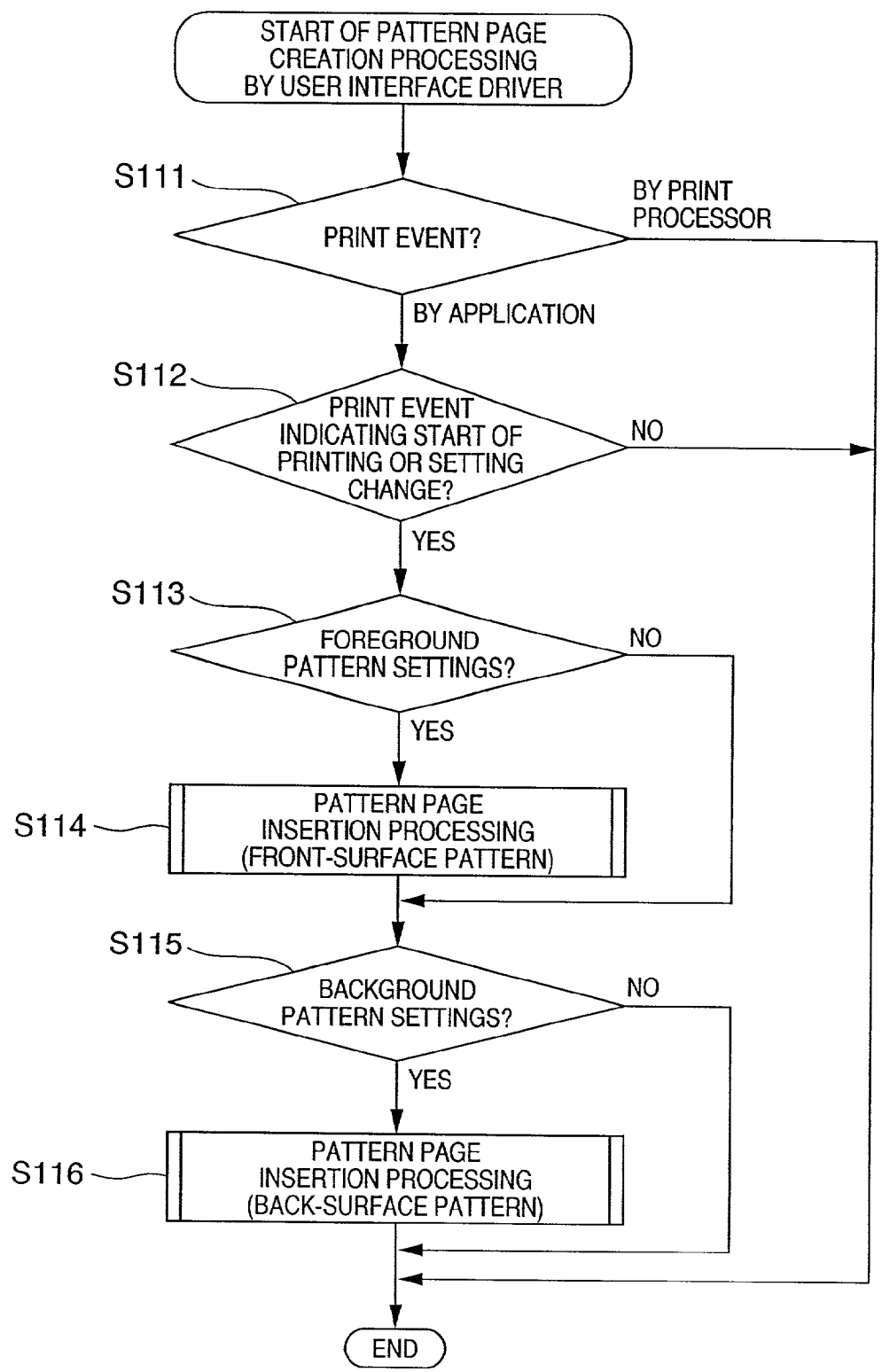
FIGS. 11A and 11B are flow charts showing a pattern page creating method executed by a user interface driver according to the second embodiment of the present invention.
Figure 11B:
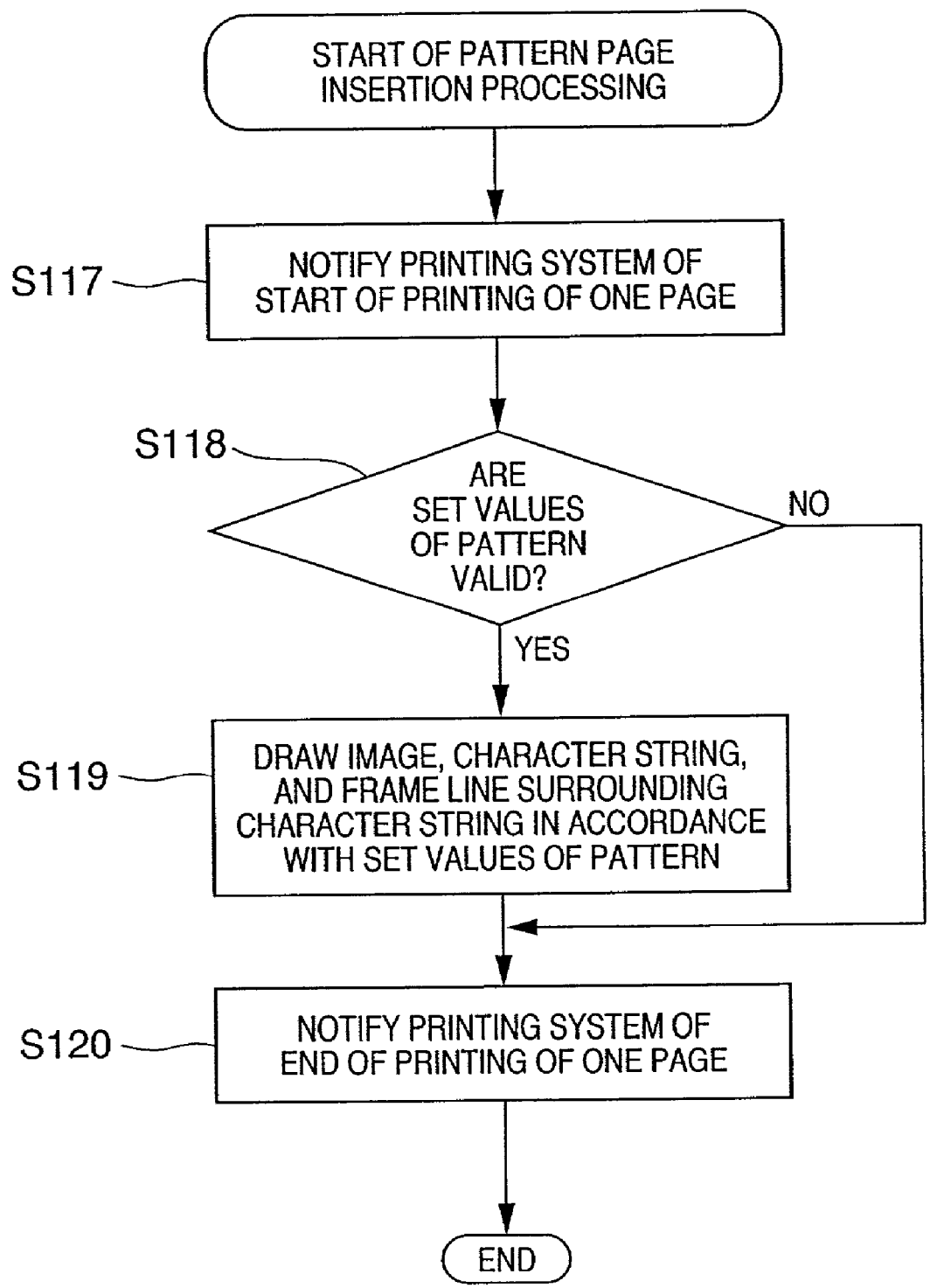
Figure 12A:
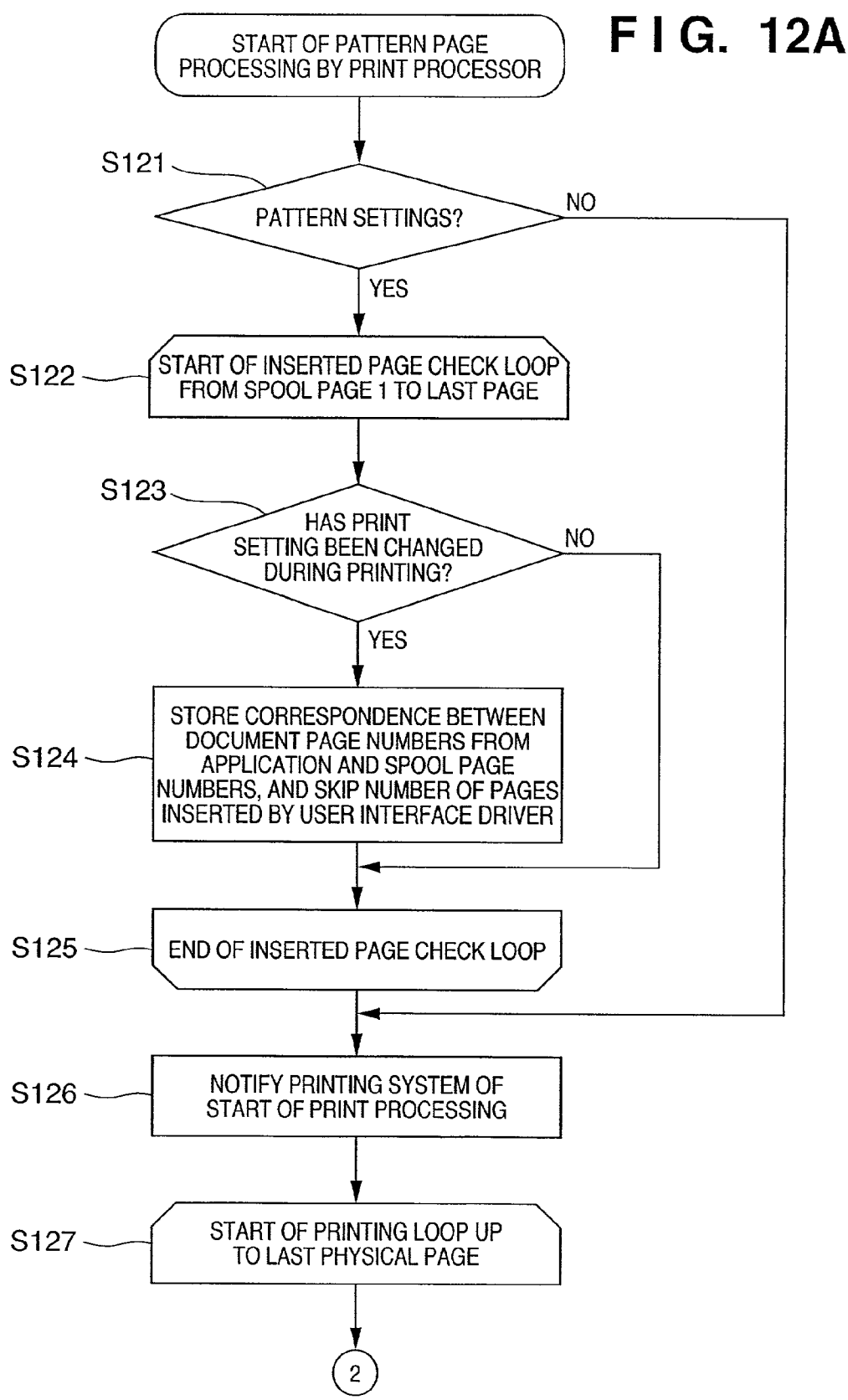
FIGS. 12A and 12B are flow charts showing a pattern page combining method executed by a print processor according to the second embodiment of the present invention.
Figure 12B:
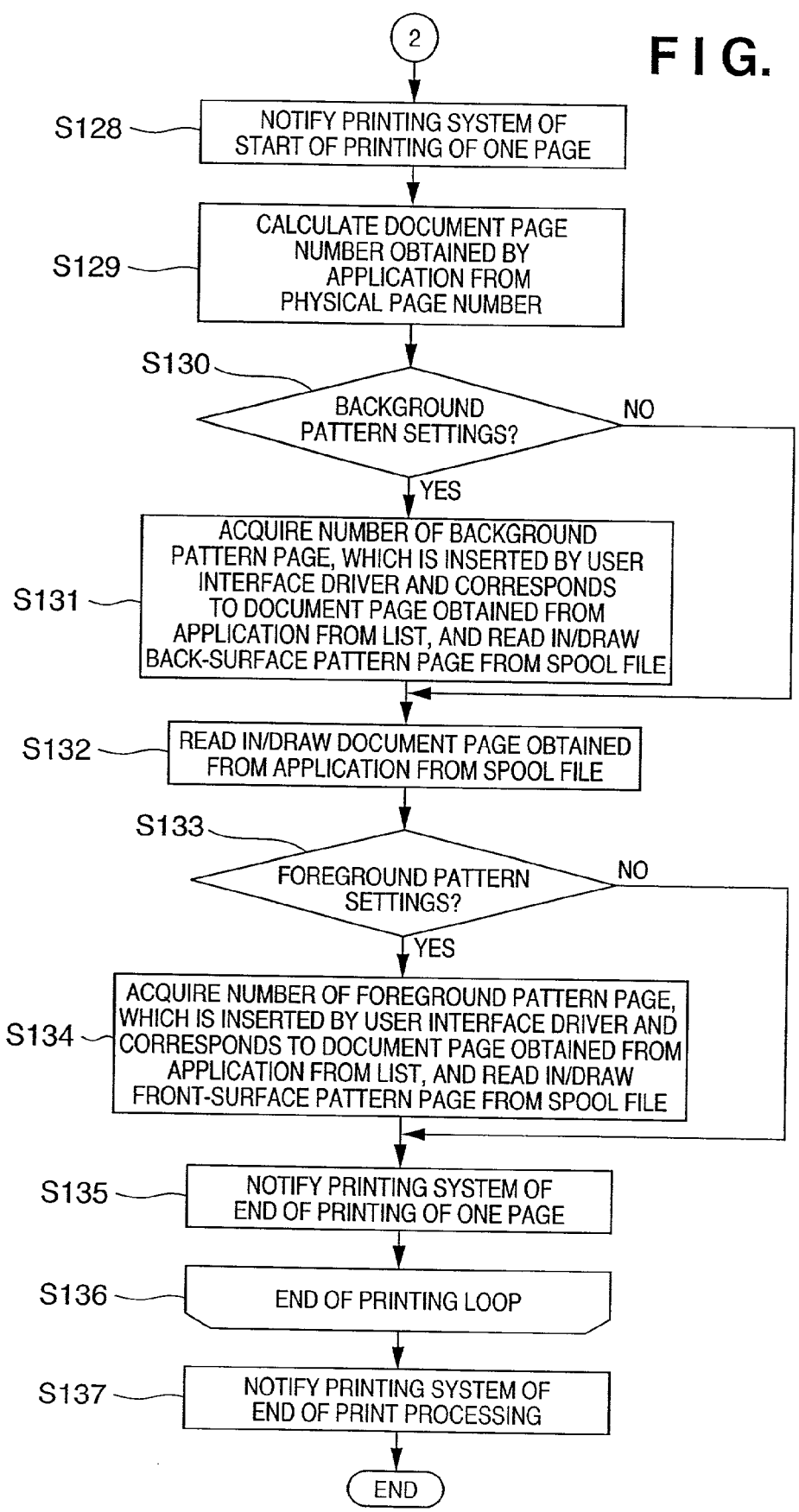

Example of Operation Procedure in Printing System According to Second Embodiment FIGS. 11A and 11B are flow charts showing the operation of the user interface driver 103 in the second embodiment. FIGS. 12A and 12B are flow charts showing the operation of the print processor 105 in the second embodiment. The overall operation of the printing system shown in FIG. 10 will be described with reference to FIGS. 11A to 12B.

Pattern page creation processing will be described first with reference to FIGS. 11A and 11B. The user interface driver 103 performs pattern page creation processing upon reception of a print event from the GDI 102.

In step S111, it is checked whether the print event notified by the GDI 102 is the one generated by the print processor 105 or application 101. If the print event is the one generated by the print processor 105, the user interface driver 103 terminates the processing without performing any operation. If the print event is the one from the application 101, the flow advances to step S112. In step S112, the type of the print event is determined. If the event is a print event indicating the start of printing, the flow advances to step S113. Otherwise, the user interface driver 103 terminates processing without performing any operation.

In step S113, it is checked whether print settings include a foreground pattern setting. If a foreground pattern setting has been made, the flow advances to step S114. If no foreground pattern setting has been made, the flow advances to step S115. In step S114, a pattern page on which only a foreground pattern is drawn is inserted. This pattern page insertion processing will be described later. After the pattern page insertion processing is terminated, the flow advances to step S115.

It is checked in step S115 whether the print settings include a background pattern setting. If a background pattern setting has been made, the flow advances to step S116. If no background pattern setting has been made, the processing is terminated. In step S116, a pattern page on which only a background pattern is drawn is inserted. This pattern page insertion processing will be described later. After the pattern page insertion processing is terminated, this procedure is terminated.

The pattern page insertion processing in steps S114 and S116 will be described in detail next.

In step S117, in place of the application 101, the user interface driver 103 notifies the printing system of the start of printing of one page to draw/create a pattern page. Since the printing system handles this notification as a notification from the application 101, the pattern page drawn by the user interface driver 103 afterward is handled like a document page drawn by the application 101.

In step S118, it is checked whether the set values of the attributes of the pattern set by the user are valid. If, for example, an image is used as a pattern, it is checked whether a corresponding image file exists. If the set values are valid, the flow advances to step S119. If the set values are invalid, the flow advances to step S120 without drawing any pattern, and a page having no pattern drawn is created. In step S119, in place of the application 101, the user interface driver 103 draws various patterns via the GDI 102 in accordance with the set values of the attributes of the patterns. If, for example, a character string is designated as a pattern, the character string is drawn in accordance with set values, e.g., a font, character color, rotational angle, and drawing position. If an image is used as a pattern, the image is drawn in accordance with set values, e.g., enlargement/reduction processing, density conversion, drawing position, and layout.

In step S120, in place of the application 101, the user interface driver 103 notifies the printing system of the end of printing of one page. As a consequence, the pattern pages drawn and created by the user interface driver 103 are stored in the EMF spool file 104.

Pattern page combining processing will be described next with reference to FIGS. 12A and 12B. The print processor 105 performs pattern page superimposition processing for each print job.

In step S121, it is checked whether pattern settings have been made. If pattern settings have been made, the print data of a page stored in the EMF spool file 104 is printed. If no pattern setting has been made, the flow advances to step S126 to start normal printing.

Steps S122 to S125 constitute a loop for recording the page numbers in the spool file and the corresponding document page numbers from the application 1 on the basis of the setting differences between the respective pages stored in the EMF spool file 104. In step S123, the print settings of two consecutive page data are compared to check whether any print setting has been changed on the way. If no change has been made, the flow advances to step S125. If a change has been made, the flow advances to step S124. In step S124, the page number in the EMF spool file 104 is stored in the corresponding list of the application 1, and the number of pattern pages in which spool page numbers to be checked next are inserted by the user interface driver 103 is skipped. When all the page data in the EMF spool file 104 are checked in step S125, the flow advances to step S126. If there is any page that is not checked, the flow returns to step S122 to check whether the print settings for the next page have been changed, thus repeating the loop.

In step S126, the print processor 105 notifies the printing system of the start of printing to actually print the page created by the print processor 105.

Steps S127 to S136 constitute a loop for printing each document page up to the final physical page to be printed. Print processing of each physical page is continued in step S128. After all the physical pages are printed, the flow advances to step S137 to notify the printing system of the end of print processing.

Print processing of each physical page is started from step S128, in which the printing system is notified first of the start of printing of one page. In step S129, the document page number from the application 1 which corresponds to the number of the physical page to be printed is calculated.

It is checked in step S130 whether background pattern settings have been made for a document page to be printed. If NO in step S130, the flow advances to step S132 to print the document page from the application 101. If YES in step S130, the flow advances to step S131. In step S131, the number of a pattern page in the EMF spool file 104 which corresponds to the number of the document page from the application 101 which is to be printed is acquired from the page correspondence list. The pattern page is then read in from the EMF spool file 104 and drawn. The flow then advances to step S132 to draw the document page from the application 101 on the drawn background pattern.

In step S132, a page number in the EMF spool file 104 which corresponds to the number of the document page from the application 101 which is calculated in step S120 is acquired from the page correspondence list, and the document page is read in from the EMF spool file 104 and drawn.

In step S133, it is checked whether foreground pattern settings have been made for the document page to be printed. If NO in step S133, the flow advances to step S135 to terminate physical page printing. If YES in step S133, the flow advances to step S134. In step S134, the number of a pattern page in the EMF spool file 104 which corresponds to the number of the document page from the application 101 which is to be printed is acquired from the page correspondence list, and the pattern page is read in from the EMF spool file 104 and drawn. The flow then advances to step S135 to terminal physical page printing.

In step S135, the user interface driver 103 notifies the printing system of the end of printing of one page, and terminates physical page printing.

With the above operation, the pattern page superimposition processing shown in FIGS. 12A and 12B is terminated. Every time the print processor 105 creates a superimposition page and notifies the end of physical page printing in step S135, the printer graphics driver 106 converts the composite page into bitmap data. The bitmap data is then supplied to the printer 107 through predetermined data transmission processing (not shown), and the superimposition page is printed.

Example of Printing by Printing System According to Second Embodiment

FIGS. 13A and 13B are conceptual views showing the relationship between the states of the pattern and document pages stored in the EMF spool file 104 and the physical pages printed on paper sheets. Assume that printing is performed under the conditions that the application 101 prints three document pages without changing any print setting in the process of printing, and foreground pattern settings have been made as print settings.

Figure 13:
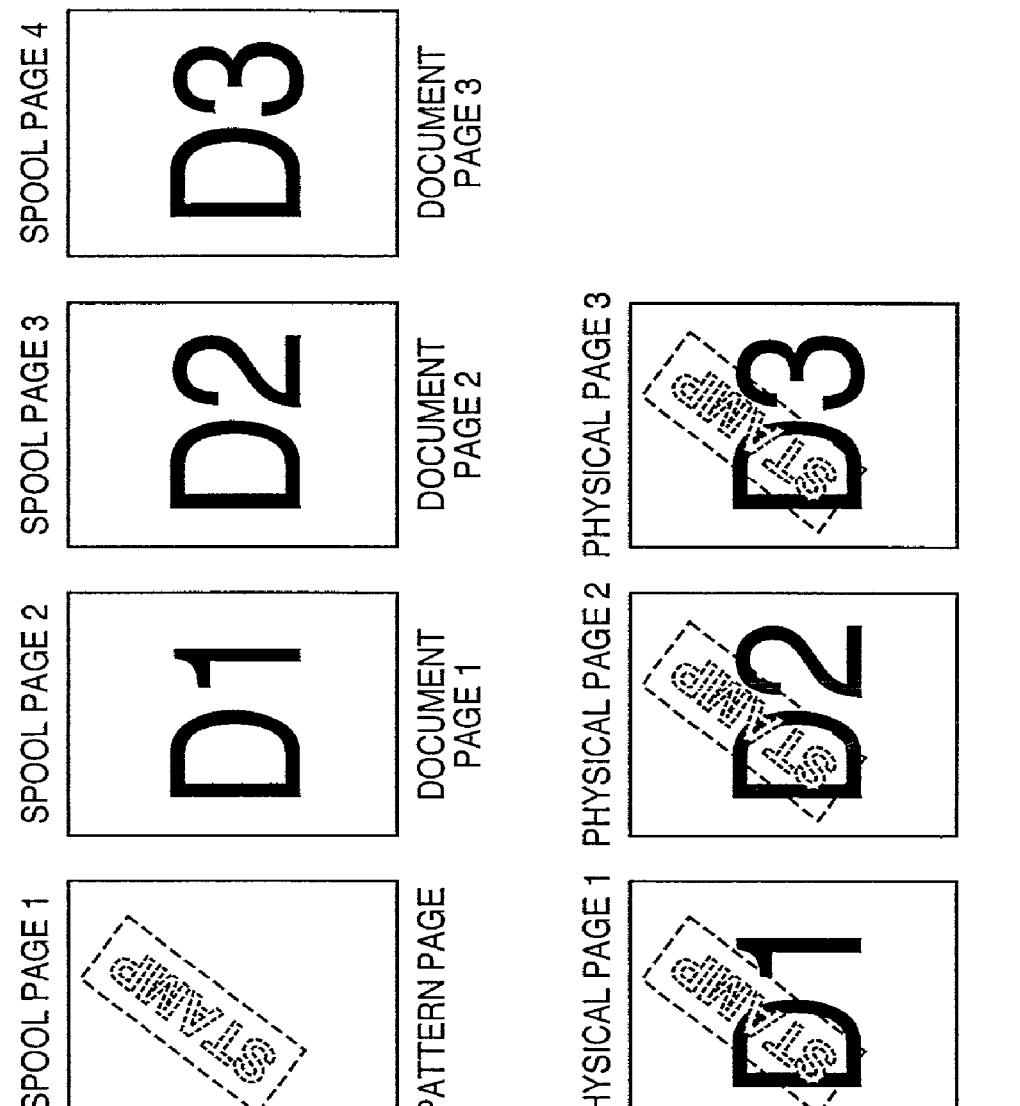
FIG. 13 is a conceptual view showing the relationship between the states of pattern and document pages stored in an EMF spool file and the physical pages printed on paper sheets according to the second embodiment of the present invention.

(A) of FIG. 13 shows the order of pages stored in the EMF spool file 104. The first page stored in the EMF spool file 104 is the foreground pattern page created by the user interface driver 103, and the document pages created by the application 101 are stored as the second, third, and fourth pages in the EMF spool file 104. The print processor 105 uses spool page 1 as an optimal pattern page for each document page, and superimposes/draws the pattern page on each document page, thereby obtaining physical pages 1, 2, and 3 as print results shown in (B) of FIG. 13.

Figure 14:
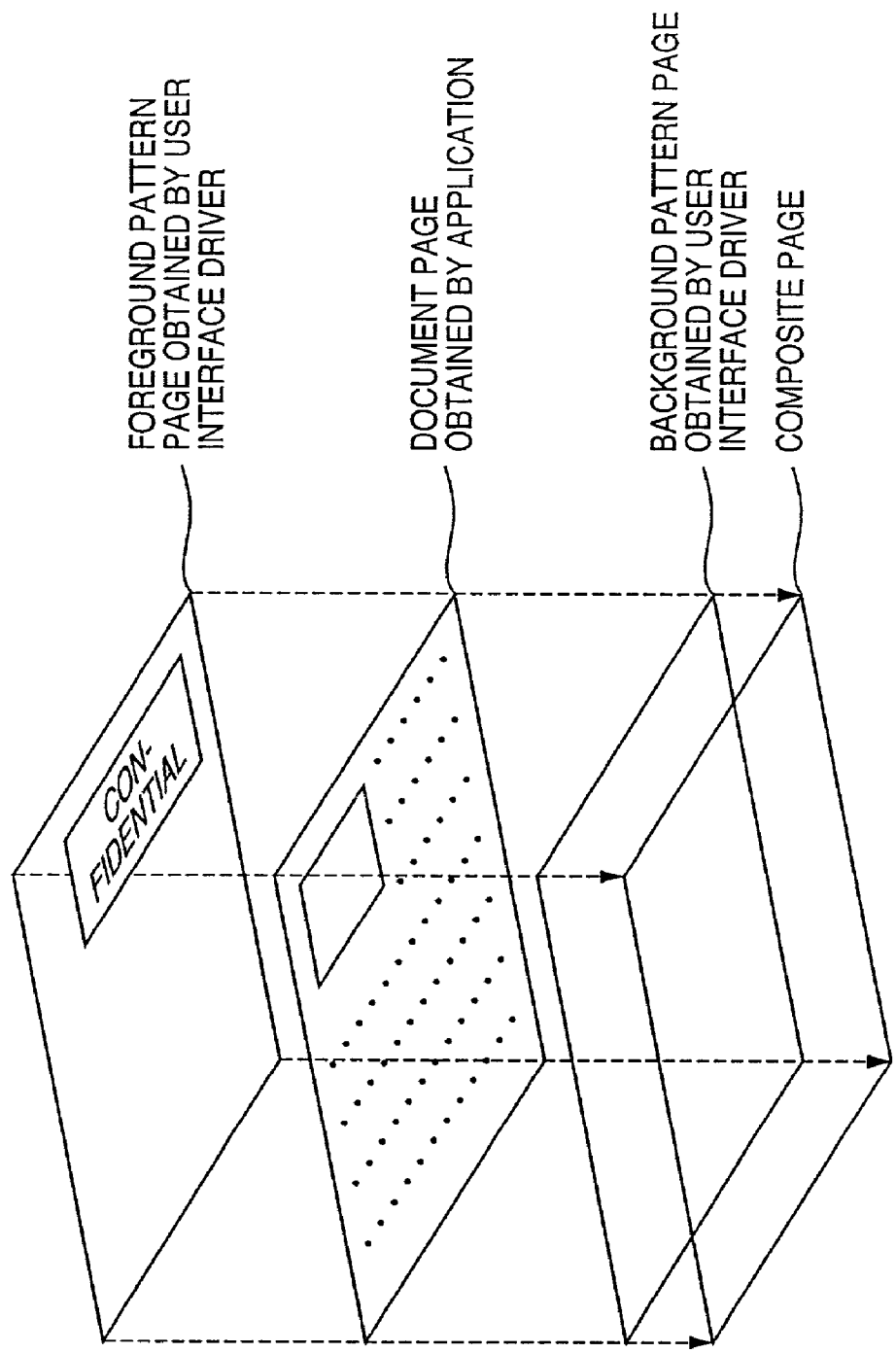
FIG. 14 is a conceptual view showing pattern page combining processing executed by the print processor which superimposes/draws front- and background patterns on a document page according to the second embodiment of the present invention.

FIG. 14 is a conceptual view showing pattern page superimposition processing by the print processor 105 which superimposes/draws foreground and background patterns with respect to a document page. If a background pattern is designated, a background pattern page is dawn first. A document page from the application 101 is then superimposed/drawn on the background pattern page. Finally, when a foreground pattern is designated, a foreground pattern page is drawn, thereby creating a superimposition page to be printed. FIG. 14 shows a character string with a frame as a foreground pattern page, although an image may be used instead of the character string. Although the pattern covering the entire page is exemplified as a back-surface page, an image may be placed on part of a page or a character string or the like may be used.

Note that the hardware configuration of the printing system according to this embodiment is basically the same as that of the first embodiment, and hence see FIG. 6.

Effects of Second Embodiment

As described above, the print processor 105 superimposes the document page to be printed, created by the application 101, and the pattern page created by the user interface driver 103, and then supplies the resultant page to the printer graphics driver 106. Therefore, the number of pattern pages is not dependent on the number of document pages, and the capacity of the storage area required by the EMF spool file 104 need not be large. Furthermore, under a network environment, the number of pattern pages remains unchanged even if the number of document pages increases, and hence the load imposed on the network can be reduced. In addition, since pattern pages are created by the user interface driver 103 on the client side, printing can be done even without a font and the like which are required to draw patterns in executing the printer graphics driver 106 on the server side.

First Modification of Second Embodiment

Paper sheets on which documents should be printed may sometimes vary in size, and documents may be printed on paper sheets some of which differ in size from the rest. In such a case, as described in the above embodiment, if processing like that described in the first embodiment is performed, since the pattern page created by the user interface driver 103 first is always used without changing the size, the position of the pattern may shift or part of the pattern may protrude, resulting in an undesired print result. If, for example, the direction of a paper sheet is changed in the process of printing, part of the pattern may not be printed. This modification will exemplify the case wherein stamps can be properly printed even with various paper sizes.

A system according to the first modification of the second embodiment will be described with reference to FIG. 10. The first modification differs from the second embodiment in that the user interface driver 103, in place of the application 101, creates pattern pages when a print event indicating the start of printing is notified and a print event indicating a change in print setting is notified. The print processor 105 superimposes an optimal pattern page on a document created by the application 101 upon a change in print setting.

The operation of the user interface driver in the first modification of the second embodiment will be described next with reference to FIGS. 11A and 11B. The operation in step S111 is the same as that in the second embodiment. In step S112, the type of a print event is determined. If the event is a print event indicating the start of printing or a print event indicating a change in print setting, the flow advances to step S113. Otherwise, the processing is terminated without any operation. In the case of a print setting change event, since pattern page insertion processing is performed immediately after a print setting is changed, the application 101 can draw pages by using the changed print settings. The remaining steps are the same as those in the second embodiment.

Figure 15:
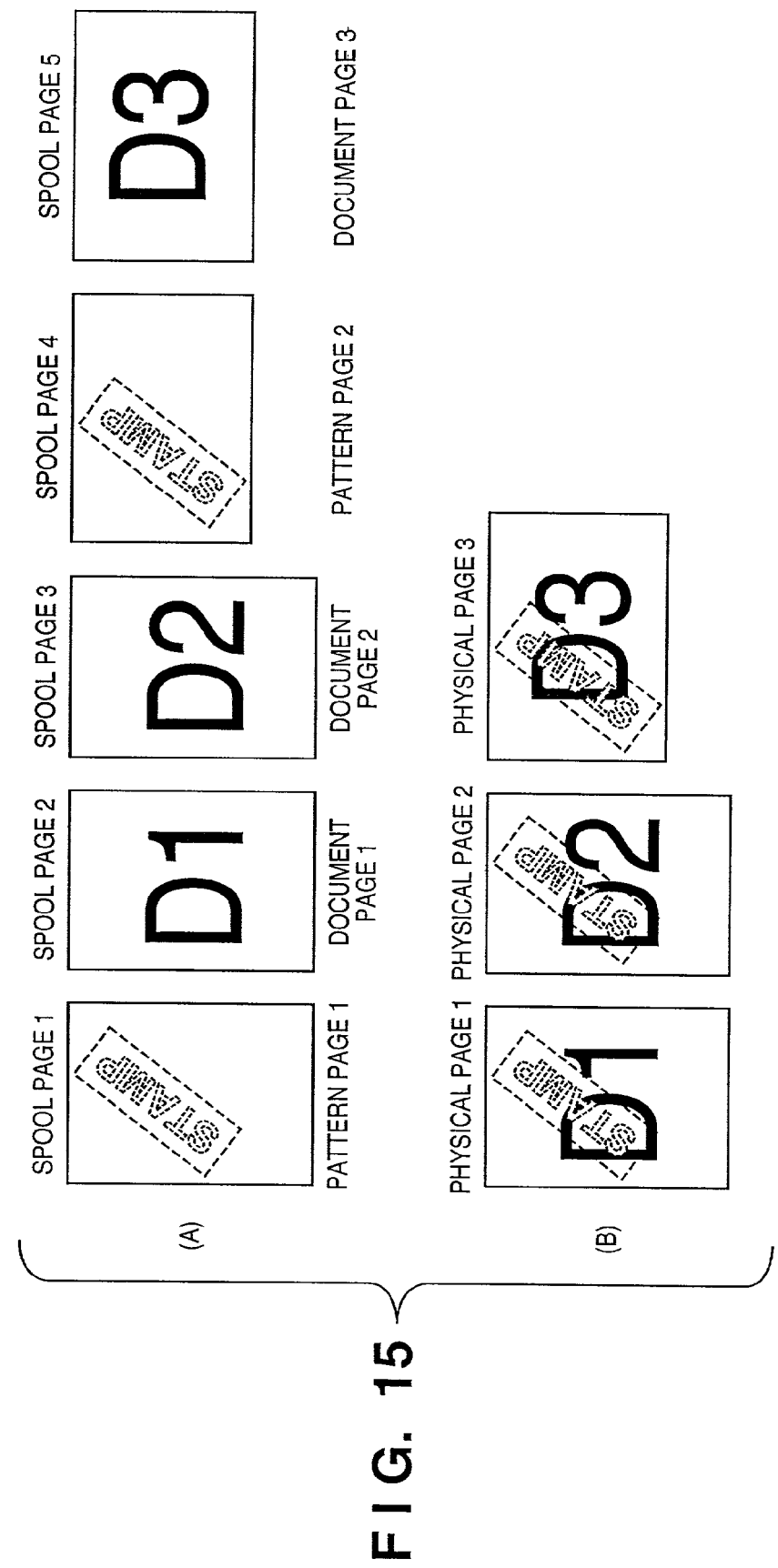
FIG. 15 is a conceptual view showing the relationship between the states of pattern and document pages stored in an EMF spool file and the physical pages printed on paper sheets according to the second embodiment of the present invention.

FIG. 15 is a conceptual view showing the relationship between the states of pattern and document pages stored in the EMF spool file 104 and the physical pages to be printed on paper sheets when print settings are changed in the process of printing. In this case, printing is performed under the conditions that the application 101 changes the print settings between document page 2 and document page 3 during printing, and prints document page 3 upon changing the direction of the paper sheet, and a foreground pattern is designed as a print setting.

(A) of FIG. 15 shows the order of pages stored in the EMF spool file 104. The first page stored in the spool file is the pattern page which is created by the user interface driver 103 and corresponds to a print start event. Document pages 1 and 2 created by the application 101 are stored as spool pages 2 and 3 in the EMF spool file 104, and the foreground pattern page which is created by the user interface driver 103 and corresponds to a print setting change event is stored as spool page 4. Finally, document page 3 is stored as spool page 5. In this case, since the application 101 changes the print settings between document page 2 and document page 3 to change the direction of a paper sheet, a pattern page corresponding to document page 3 is stored as spool page 4.

In this case, since the user interface driver 103 is notified that the direction of paper sheets is changed by the print setting change event, if, for example, the position of a character string is "upper left" on the paper sheet, the character string can be printed in a well-balanced state even if the paper size is changed. The print processor 105 uses spool page 1 for document pages 1 and 2 as an optimal pattern page for the respective document pages, and also uses spool page 4 for document page 3. The print processor 105 then superimposes/draws the pattern pages on the respective document pages to obtain physical pages 1, 2, and 3 as the print results shown in (B) of FIG. 15. In addition, even when the paper size or the position of a pattern is changed, a pattern page can be created at a desired position, and a good output result can be obtained by making the user interface driver 103 properly draw the pattern in accordance with a print setting change event.

Although not shown in FIG. 15, if, for example, the size of an output paper sheet in (B) of FIG. 15 is half that of a document page stored in the EMF spool file 104, the pattern protrudes from the document page when the pattern is made to correspond to the document page. In this case, a small pattern is selected to be superimposed on the document page upon being repositioned as needed. In contrast to this, if the size of an output paper sheet is double that of a document page, the pattern is too small. In this case, a larger pattern is selected and superimposed on the document page upon being reposition as needed. In addition, if a document page differs in size from a paper sheet, e.g., the document page and print sheet respectively have A and B sizes, a pattern is so selected as to fall within the size of a paper sheet, and is repositioned as needed. With such various sizes, patterns can be properly selected and positioned. These techniques are also incorporated in the present invention.

Effect of First Modification

As described above, the user interface driver 103 creates/processes pattern pages in accordance with paper sizes and a pattern layout setting. Even if, therefore, the paper size changes or various changes in state occur, patterns can be printed at proper positions in accordance with the changes.

Effects of Second Embodiment

According to this embodiment, there are provided a print data creating method and a printing system for the method, in which when print data including print data for information communication and print data for function display (e.g., a stamp like "confidential") is to be printed, the required capacity of a storage area can be reduced, the load imposed on the network can be reduced, and printing can be done even without a font and the like on the server side.

More specifically, the print processor 105 superimposes the document page which is to be printed and created by the application 101 and the pattern page created by the user interface driver 103, and supplies the resultant page to the printer graphics driver 106. With this operation, the number of pages does not depend on the number of document pages, and the capacity of the storage area which is required by the EMF spool file 104 need not be large. In addition, under a network environment, the number of pattern pages remains unchanged even if the number of document pages increases, and hence the load imposed on the network can be reduced. Furthermore, since pattern pages are created by the user interface driver 103 on the client side, printing can be done even without a font and the like which are required to draw patterns in executing the printer graphics driver 106 on the server side.

In addition, the user interface driver 103 creates/processes pattern pages in accordance with paper sizes and a pattern layout setting. Even if, therefore, the paper size changes or various changes in state occur, patterns can be printed at proper positions in accordance with the changes.

The present invention may be applied to a system constituted by a plurality of devices (e.g., a host computer, an interface device, a reader, a printer, and the like) or an apparatus comprising a single device.

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, programs including program codes corresponding to the flow charts described above are stored in this storage medium.

As many apparently widely different embodiments of the present invention can be made without departing from the spirit and scope thereof, it is to be understood that the invention is not limited to the specific embodiments thereof except as defined in the appended claims.

What is claimed is:

1. A computer for reading a document page from a standard spool file equipped in a printing system, in which document gages created using an application are stored, and creating bitmap data to be supplied to a printer in correspondence with the read document page, said computer comprising:

a user interface driver adapted to create a pattern page in which a pattern is drawn in place of the application, when it is set to superimpose the pattern in response to an event of print start indicated from the application;

a print processor adapted to read a document page and a pattern page from the standard spool file and make a superimposed page of the read document page and the read pattern page; and a printer driver adapted to create bitmap data in correspondence with the made superimposed page, wherein the printing system operates so that the pattern page created by the user interface driver and the document pages applied from the application are stored into the standard spool file.

2. A computer according to claim 1, wherein said print processor reads a document page and a pattern page out of the spool file, makes a superimposed page, and supplies the superimposed page to a graphical device interface, and said printer driver creates bitmap data in correspondence with the superimposed page based on a drawing command generated from said graphical device interface.

3. A computer according to claim 1, wherein the pattern page includes a pattern on a margin to paste up.

4. A computer according to claim 1, wherein the pattern page includes a pattern on a cut margin.

5. A computer according to claim 1, wherein said user interface driver creates a pattern page in response to a change of print settings.

6. A method of reading a document page from a standard spool file equipped in a printing system, in which document gages created using an application are stored, and creating bitmap data to be supplied to a printer in correspondence with the read document page, said method comprising the steps of:

creating a pattern page in which a pattern is drawn in place of the application, by a user interface driver, when it is set to superimpose the pattern in response to an event of print start indicated from the application;

reading a document page and a pattern page from the standard spool file and making a superimposed page of the read document page and the read pattern page, by a print processor; and creating bitmap data, by a printer driver, in correspondence with the made superimposed page, wherein the printing system operates so that the pattern page created by the user interface driver and the document pages applied from the application are stored into the standard spool file.

7. A method according to claim 6, wherein in the step of making a superimposed page, a document page and a pattern page are read from the spool file, a superimposed page is made from the document page and the pattern page, and the superimposed page is supplied to a graphical device interface, and in the step of creating bitmap data, bitmap data is created in correspondence with the superimposed page based on a drawing command generated from the graphical device interface.

8. A method according to claim 6, wherein the pattern page includes a pattern on a margin to paste up.

9. A method according to claim 6, wherein the pattern page includes a pattern on a cut margin.

10. A method according to claim 6, wherein in the step of creating a pattern page, a pattern page is created in response to a change of print settings.

11. A computer-readable medium encoded with a computer program for reading a document page from a standard spool file equipped in a printing system, in which document gages created using an application are stored, and creating bitmap data to be supplied to a printer in correspondence with the read out document page, said computer program comprising the steps of:

creating a pattern page in which a pattern is drawn in place of the application, by a user interface driver, when it is set to superimpose the pattern in response to an event of print start indicated from the application;

reading a document page and a pattern page from the standard spool file and making a superimposed page of the read document page and the read pattern page, by a print processor; and creating bitmap data, by a printer driver, in correspondence with the made superimposed page, wherein the printing system operates so that the pattern page created by the user interface driver and the document pages applied from the application are stored into the standard spool file.

12. A program computer-readable medium according to claim 11, wherein in the step of making a superimposed page, a document page and a pattern page are read from the spool file, a superimposed page is made from the document page and the pattern page, and the superimposed page is supplied to a graphical device interface, and in the step of creating bitmap data, bitmap data is created in correspondence with the superimposed page based on a drawing command generated from the graphical device interface.

13. A computer-readable medium according to claim 11, wherein the pattern page includes a pattern on a margin to paste up.

14. A computer-readable medium according to claim 11, wherein the pattern page includes a pattern on a cut margin.

15. A computer-readable medium according to claim 11, wherein in the step of creating a pattern page, a pattern page is created in response to a change of print settings.

* * * * *

UNITED STATES PATENT AND TRADEMARK OFFICE
CERTIFICATE OF CORRECTION

PATENT NO.       : 7,298,510 B2
APPLICATION NO.  : 10/138484
DATED            : November 20, 2007
INVENTOR(S)      : Hideo Natori It is certified that error appears in the above-identified patent and that said Letters Patent is hereby corrected as shown below:

ON TITLE PAGE AT ITEM (56) FOREIGN PATENT DOCUMENTS

"JP     2000-025276   1/2000" should read --JP   2000-025278   1/2000--; and
"JP     04343167 A * 11/1992" should read --JP   04-343167 A * 11/1992--.

COLUMN 3

Line 4, "image" should read --image data--.

COLUMN 5

Line 34, "suppress" should read --keep--; and
Line 54, "image" should read --image data--.

COLUMN 7

Line 39, "superimposing" should read --superimposing a--.

COLUMN 8

Line 60, "front-" should read --fore- --.

COLUMN 18

Line 15, "Ads," should be deleted.

COLUMN 20

Line 25, "application" should read --application 101--;
Line 33, "application 1," should read --application 101,--; and
Line 53, "application 1" should read --application 101--.

COLUMN 23

Line 45, "reposition" should read --repositioned--.

UNITED STATES PATENT AND TRADEMARK OFFICE
CERTIFICATE OF CORRECTION

PATENT NO. : 7,298,510 B2
APPLICATION NO. : 10/138484
DATED : November 20, 2007
INVENTOR(S) : Hideo Natori It is certified that error appears in the above-identified patent and that said Letters Patent is hereby corrected as shown below:

COLUMN 25

Line 4, "gages" should read --pages--; and
Line 38, "gages" should read --pages--.

COLUMN 26

Line 19, "gages" should read --pages--; and
Line 38, "program" should be deleted.

Signed and Sealed this

Thirtieth Day of December, 2008

JON W. DUDAS
*Director of the United States Patent and Trademark Office*